US012275212B2

(12) United States Patent
Thériault et al.

(10) Patent No.: US 12,275,212 B2
(45) Date of Patent: Apr. 15, 2025

(54) REPOSITIONING STATION

(71) Applicant: CONCEPTION IMPACK DTCI INC., Saint-Jacques (FR)

(72) Inventors: Dominic Thériault, Saint-Jacques (CA); Mathieu Tremblay, Laval (CA); Michel Beauséjour, Joliette (CA); Raphaël Desmarais, Sainte-Marthe-sur-le-Lac (CA); Javier De La Calle, Notre-Dame-des-Prairies (CA); David Leblanc, Sainte-Julienne (CA); Jonathan Lemay, Sainte-Sophie (CA)

(73) Assignee: CONCEPTION IMPACK DTCI INC., Saint-Jacques (CA)

( * ) Notice: Subject to any disclaimer, the term of this patent is extended or adjusted under 35 U.S.C. 154(b) by 188 days.

(21) Appl. No.: 17/912,366

(22) PCT Filed: Mar. 17, 2021

(86) PCT No.: PCT/CA2021/050357
§ 371 (c)(1),
(2) Date: Sep. 16, 2022

(87) PCT Pub. No.: WO2021/184120
PCT Pub. Date: Sep. 23, 2021

(65) Prior Publication Data

US 2023/0182430 A1 Jun. 15, 2023

Related U.S. Application Data

(60) Provisional application No. 62/991,014, filed on Mar. 17, 2020.

(51) Int. Cl.
*B65H 29/66* (2006.01)
*B31B 50/98* (2017.01)
(Continued)

(52) U.S. Cl.
CPC .......... *B31B 50/98* (2017.08); *B65H 29/125* (2013.01); *B65H 29/66* (2013.01);
(Continued)

(58) Field of Classification Search
CPC .. B65H 29/66; B65H 29/6645; B65H 29/669; B65H 2301/4214; B65H 2301/42146;
(Continued)

(56) References Cited

U.S. PATENT DOCUMENTS

| | | | |
|---|---|---|---|
| 2,699,942 | A | 1/1955 | Rineer |
| 2,841,394 | A | 7/1958 | Stobb |

(Continued)

FOREIGN PATENT DOCUMENTS

| | | | |
|---|---|---|---|
| CN | 203682542 | U | 7/2014 |
| DE | 2251108 | A1 | 5/1974 |

(Continued)

OTHER PUBLICATIONS

Extended European Search Report in corresponding European Patent Application No. 21770705.8, dated Mar. 18, 2024, 6 pages.

(Continued)

*Primary Examiner* — Luis A Gonzalez
(74) *Attorney, Agent, or Firm* — Cozen O'Connor

(57) ABSTRACT

The repositioning station (200) allows a continuous shingled stream (120) of overlapping semirigid planar articles (100) to be transported on an incoming conveyor (122) along a transport circuit (204) onto an outgoing conveyor (302) so as to form a stack that can be carried away upon the outgoing conveyor (302). The repositioning station (200) includes a lateral deviation assembly (210) and may also include a final positioning assembly (212). The transport circuit (204) within the lateral deviation assembly (210) follows a generally ellipsoidal deviation path to veer the shingled stream (120) and also to pivot the articles (100) therein about a
(Continued)

curvilinear axis (206) from a facedown position to an upright position. The outgoing conveyor (302) can carry the cartons (100) in a direction that is parallel to that of the incoming conveyor (122).

14 Claims, 30 Drawing Sheets

(51) Int. Cl.
*B65H 15/00* (2006.01)
*B65H 29/12* (2006.01)
*B65H 31/06* (2006.01)

(52) U.S. Cl.
CPC .................. *B65H 2301/321* (2013.01); *B65H 2301/33214* (2013.01); *B65H 2301/33216* (2013.01); *B65H 2701/1766* (2013.01)

(58) Field of Classification Search
CPC .... B65H 2301/321; B65H 2301/33214; B65H 31/06; B65H 2301/332; B65H 2301/33212; B65H 2301/33216; B65H 2301/33222; B65H 2301/4211; B65H 2301/42114; B65H 15/00; B65H 29/12; B65H 29/125; B65H 5/06
See application file for complete search history.

(56) References Cited

U.S. PATENT DOCUMENTS 3,932,982 A 1/1976 Klapp
4,240,539 A * 12/1980 Klapp ................ B65H 29/6645 271/151
4,332,124 A 6/1982 Jaton
4,411,350 A * 10/1983 Wolfram ................ B65G 13/00 198/417
4,705,157 A * 11/1987 Bowles .................. B65H 15/00 198/405
5,368,287 A 11/1994 Belec et al.
5,411,250 A 5/1995 Belec et al.
7,967,124 B2 6/2011 Theriault
8,915,350 B2 12/2014 Tanner
9,517,897 B2 12/2016 Theriault et al.
2008/0141619 A1* 6/2008 Ponti ...................... B65H 33/04 53/251
2011/0120837 A1 5/2011 Theriault

FOREIGN PATENT DOCUMENTS

EP 3 070 007 A1 9/2016
WO 2014040187 A1 3/2014

OTHER PUBLICATIONS

International Search Report and Written Opinion of the International Search Authority for International Patent Application No. PCT/CA2021/050357 dated Jun. 7, 2021, 8 pages.
Chinese First Office Action in corresponding Chinese Patent Application No. 202180027715.4, dated Aug. 19, 2024, 10 pages with English Translation.

* cited by examiner

REPOSITIONING STATION

CROSS REFERENCE TO PRIOR APPLICATION

The present case is a 35 U.S.C. § 371 filing of International Application No. PCT/CA2021/050357 filed 17 Mar. 2021, which claims the benefits of U.S. patent application No. 62/991,014 filed 17 Mar. 2020. The entire content of each prior patent application is hereby incorporated by reference.

TECHNICAL FIELD

The technical field relates generally to the repositioning of continuous shingled streams of overlapping semirigid planar articles, for instance folding cartons or the like.

BACKGROUND

Folding cartons are used in a wide range of industries for packaging products. Cartons are generally manufactured on a production line by folding and gluing carton blanks using a folding-gluing machine. The cartons coming out of such folding-gluing machine are usually disposed to form a continuous row on an output conveyor, which receives the cartons on its upper surface as it advances. The cartons are then arranged in an overlapping manner where they are partially positioned on top of one another. The row of overlapping cartons forms what is called hereafter a continuous shingled stream. The cartons are then also in a flat configuration, namely in a configuration where the various panels of each carton are flat folded to essentially eliminate or minimize the entire internal volume thereof. The cartons are flat folded to optimize the space for their transportation and storage prior to their initial use, among other things. The cartons are generally shipped from a manufacturer to a packager in containers, for instance shipping boxes or bins. The packager often has its own machinery to bring the collapsed cartons into their final expanded shape so as to create an internal load volume for receiving a given product or for a given purpose. This process can also be done manually by the packager, at least in part. Other methods and situations are possible as well. The cartons can also be packaged or bundled for transportation or storage without necessarily being inserted into containers such as boxes or bins. Other variants are possible as well.

Cartons can be inserted into containers at a packing station, which is often located at the end of a production line. This loading process can be done manually by one or more operators, with or without mechanical assistance, or using a fully automated handling system.

Each container that may be used for shipping or storing cartons can hold a given number of these cartons and in many implementations, the cartons are automatically counted at some point to ensure that each container or the like will receive the proper number of cartons. They are generally counted prior to their arrival at the packing station, often at the outlet of the folding-gluing machine itself before the continuous shingled stream is created. The count is required to determine where begins or ends each group of counted cartons. These groups are called batches hereafter. The continuous shingled stream will be segmented at some point, generally at the packing station, and each container will receive one or more of these batches.

Counting the cartons once the continuous shingled stream is formed can sometimes be done, but this is often undesirable because it can increase costs and complexity of the equipment, among other things. Likewise, manually counting carton, for instance at the packing station, is often very difficult to implement and generally creates numerous challenges unless the production rate is relatively small.

Different approaches are possible for showing the demarcations between the batches in a continuous shingled stream. One possible approach is to separate the continuous shingled stream into a series of discontinuous shingled streams, each corresponding to a batch and being spaced apart from the preceding and the successive one, before they reach the packing station. This approach, however, requires having an additional handling system to carry out the separation process somewhere between the folding-gluing machine and the packing station, thereby adding costs and increasing the required floor space, among other things.

Another possible approach is to have a printing system that can put a small symbol or the like on the first or last carton of each batch within a continuous shingled stream so as to show where to separate the batches from one another at the packing station. If required, the symbol on the marked cartons can be made using an ink visible only under an ultraviolet (UV) light source. There will then be a way to see the symbols on the marked cartons at the packing station and this will provide a visual indication to be seen by a manual operator by means of a light source, for instance a UV light source if the ink can only be seen with it, or by means of a suitable electronic sensor when a fully automated system is provided. Using a printing system, however, will add costs and it may even be undesirable in some cases. For instance, a packager may not always find that having a symbol of some of the cartons is acceptable, even if it can only be seen under a UV light. The material of the cartons may also prevent the ink from suitably adhering or may create other issues. Among other things, some of the symbols could be difficult or even impossible to see once the cartons arrive at the packing station, for instance if they were unexpectedly removed from the surface of the cartons after a brief contact of this surface with an adjacent carton or with a given piece of equipment at some point along the transport circuit. Losing the count of the cartons, even just sporadically, will most likely result in errors in the quantity of cartons being inserted in some of the containers or will require the production line to be stopped for manually recounting the cartons, thereby creating undesirable delays decreasing the productivity.

Another possible approach is to laterally offset the position of some of the cartons for showing the demarcations between the batches within a continuous shingled stream. The cartons coming out of the output conveyor at the outlet of a folding-gluing machine in a continuous shingled stream are generally identically aligned and orientated. Periodically moving some of the cartons edgewise over a given distance, for instance about 25 mm, can mark the beginning or the end of each batch, thereby indicating where the continuous shingled stream must be separated into batches at the packing station. This solution, among other things, does not require using a costly handling system to physically separate a continuous shingled stream into a series of discontinuous shingled streams, before the cartons reach the packing station, or using a printing system to mark the transition between the batches. However, implementing this approach can be challenging because the visual clues provided by the edgewise offset positioning of some of these cartons can easily be lost. Among other things, the marking cartons can move back into alignment or almost into alignment with the others. Cartons that are relatively stiff and that have surfaces with a high degree of smoothness can be prone to this problem. Other factors can also be involved, for instance the configuration of the equipment to handle the shingled stream.

The outer surfaces of folding cartons are generally very smooth because this smoothness is often desirable for different reasons. However, this characteristic also tends to decrease the friction between two adjacent cartons within the shingled stream. The relatively lightweight of each carton, combined with the fact that they are semirigid articles with outer surfaces having a relatively high-degree of smoothness, can exacerbate the tendency of the offset cartons to move back into an aligned position very easily at some point of the transport circuit. Other factors, such as cyclic accelerations and decelerations of the conveyors carrying the shingled stream as well as vibrations generated by the numerous associated mechanisms, may also increase the tendency. Hence, the position offset approach often imposes its own challenges.

Folding cartons are often made using sheets of materials such as cardboard, corrugated cardboard or microplate cardboard, to name just a few. They generally have at least two major sides and depending on the materials as well as the thickness of these materials, some cartons can be easily damaged if they are subjected to even a slight bending beyond a critical angle, often less than 2 degrees from the median plane of the carton. Overly bending these cartons can cause a generally permanent and aesthetically undesirable deformation, such as a crease, on at least one of their major sides. There is thus often limits imposed on how folding cartons can be manipulated by the repositioning equipment.

Cartons have at least a marginal flexibility, some more than others. Stiffness is generally a desirable property in most instances since it provides strength and reduces the propensity of the cartons to bulge under the weight when they are used. In this context, folding cartons can be considered as being semirigid. Among other things, they are far more rigid than a sheet of paper or even an article consisting of numerous sheets of paper assembled such as a newspaper or a magazine, but they are typically not hard and sturdy as would be a sheet of metal of a similar thickness.

Many implementations require that the cartons be stacked vertically at the packing station, thus that these cartons are in an upright position. This can facilitate the handling of the batches, for instance their insertion into containers or the like. The cartons must then be repositioned accordingly at some point along their transport circuit. The real challenge is to find a suitable and versatile approach.

U.S. Pat. No. 4,332,124 of 1 Jun. 1982 discloses a device for delivering and packaging folded boxes in an overlapping shingled relationship. Some of the folded boxes can be shifted laterally or sidewise for delimiting the batches. However, the device requires that the incoming and outgoing conveyors be disposed perpendicularly. This may not always be possible or suitable in some implementations, particularly if the floor space is very limited. The part of the device provided to pivot the folded boxes about a central axis is also relatively long.

There is some room for further improvements in this area of technology.

SUMMARY

The proposed concept relates to a repositioning station for handling a continuous shingled stream of overlapping semirigid planar articles such as folding cartons.

In one aspect, there is provided a repositioning station for a continuous shingled stream of overlapping semirigid planar articles in which the articles, being carried upon an incoming conveyor in a flat configuration and in a facedown position, enter the repositioning station in a first horizontal direction and then transported by the repositioning station in a second horizontal direction onto an outgoing conveyor to form a stack with the articles in an upright position that is carried away upon the outgoing conveyor in a third horizontal direction, the repositioning station defining a transport circuit and including: a lateral deviation assembly located at an inlet of the repositioning station, the lateral deviation assembly including a plurality of lengthwise-disposed roller units along which the transport circuit follows a generally ellipsoidal deviation path to veer the shingled stream from the first direction to the second direction and also to pivot the articles in the shingled stream from the facedown position to the upright position about a curvilinear axis coinciding with the innermost and bottommost boundary of the transport circuit throughout the lateral deviation assembly.

In another aspect, there is provided a repositioning station as described, shown and/or suggested herein.

In another aspect, there is provided a system for handling a continuous shingled stream, which system is as described, shown and/or suggested herein.

In another aspect, there is provided a method of handling a continuous shingled stream, which method is as described, shown and/or suggested herein.

More details on the different aspects of the proposed concept and the various possible combinations of technical characteristics will become apparent in light of the following detailed description and the corresponding figures.

DETAILED DESCRIPTION

Figure 1:
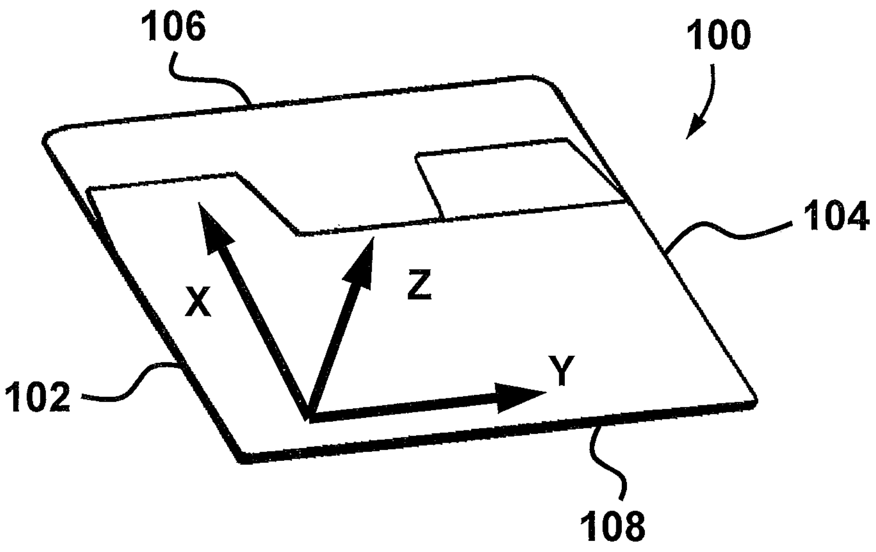
FIG. 1 is a semi-schematic view illustrating a generic example of a semirigid planar article, in this case a folding carton.

FIG. 1 is a semi-schematic view illustrating a generic example of a semirigid planar article, in this case a folding carton 100. The illustrated generic carton 100 is just one example among a wide range of possibilities. It is also important to understand that the articles are not necessarily limited to folding cartons since other types of articles could be repositioned as presented herein. The following detailed description and the appended figures present the articles as being cartons but this is only for the sake of simplicity.

Planar articles such as the carton 100 shown in FIG. 1 are said to be semirigid because the main panels have a relatively limited flexibility, and sometimes only a marginal flexibility, but they are not totally inflexible. They can be made of material such as cardboard, compact fiberboard, corrugated cardboard, plastics, micro flute cardboard, etc. Some cartons can be made of more than one material. Other materials are possible as well.

The generic carton 100 depicted in FIG. 1 represents a carton in a flat configuration coming out of a folding-gluing machine on a production line. Cartons manufactured by a folding-gluing machine are generally transported over a conveyor at its exit. The main panels of the carton 100 are then flat folded onto one another, thereby essentially eliminating or almost eliminating the internal volume thereof to minimize the space for its transportation and storage prior to the initial use. The cartons 100 can still have a small internal volume therein when flat folded because of the elasticity of some of its parts and still be considered having a flat configuration.

The carton 100, in a flat configuration as shown in FIG. 1, has a length, a width and a thickness. In this generic example, the length corresponds to the X-axis of the coordinate system depicted in FIG. 1, the width corresponds to the Y-axis and the thickness to the Z-axis. The thickness is a significantly smaller dimension than the length and the width in this example. Axes X and Y define the median plane of the carton 100. This carton 100 also includes four outer edges defining a medial plane, namely edges 102, 104, 106 and 108, that are substantially straight and uninterrupted in this illustrated example. When the carton 100 is unfolded for its first use, the X-axis will be oriented vertically upwards. Until then, the carton 100 will be kept in its flat configuration. Other configurations and arrangements are possible. Among other things, while the carton 100 shown in FIG. 1 is more or less rectangular and has uninterrupted straight edges, other shapes and configurations are possible. For instance, one or more of the edges of a carton may be non-linear or discontinuous. The exact construction or configuration of the carton 100, including the proportions between its length, its width, and its thickness, as well as the correlations between these dimensions and the X-, Y- and Z-axes, can be different in some implementations. Other variants are possible as well.

Figure 2:
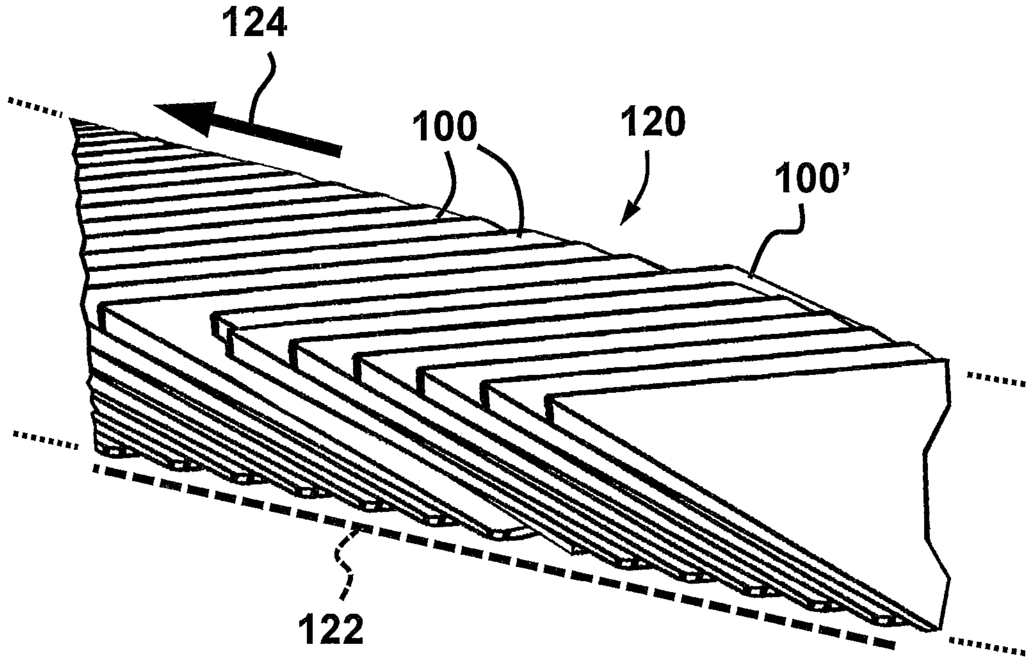
FIG. 2 is a semi-schematic view illustrating a generic example of a continuous shingled stream of overlapping cartons.

FIG. 2 is a semi-schematic view illustrating a generic example of a continuous shingled stream 120 of overlapping cartons 100. These cartons 100 are in a facedown position. This represents, for instance, cartons being transported towards a packing station to be inserted into containers. The cartons 100 are juxtaposed in a single row, and the length of the interval between two immediately adjacent cartons 100 is called the pitch.

It should be noted that FIG. 2 only includes a limited number of schematically depicted cartons 100 for the sake of simplicity. In an actual implementation, the shingled stream 120 generally remains uninterrupted from the beginning to the end of a production cycle, which can often extend over many hours, even more. The cartons 100 in the shingled stream 120 can be identical or similar to the one shown in FIG. 1, or they can be completely different, depending on the actual implementation. Other configurations and arrangements are possible. Among other things, the shingled stream

120 does not have a minimum time duration to be considered as continuous and a production cycle can be relatively short in some instances. Other variants are possible as well.

The cartons 100 within the illustrated shingled stream 120 of FIG. 2 simply rest by gravity on a conveyor, for instance the horizontal upper surface of an endless belt conveyor 122, as schematically depicted. The shingled stream 120, when it is carried upon the conveyor 122, generally advances in a substantially horizontal and rectilinear direction depicted by arrow 124. As can be seen, the bottom surface of each carton 100 is only partially in contact with the conveyor 122 because each carton 100 overlaps an immediately adjacent carton 100. Only the initial carton of a continuous shingled stream generally lies entirely on the upper surface of the conveyor 122, for instance at the beginning of a new production cycle. The motion of the shingled stream 120 can be stopped and resumed from time to time, if required, but the shingled stream 120 will remain generally unchanged. Variants are possible as well.

Assuming that the cartons 100 provided in the shingled stream 120 of FIG. 2 are all configured like the one depicted in FIG. 1, the X-axis is parallel to the direction 124 and the edges 102, 104 are both longitudinally extending lateral edges. The Y-axis is then perpendicular to the direction 124 and the edges 106, 108 are both transversal edges, with the edge 106 being the leading edge 106 and the edge 108 being the trailing edge in this example. The trailing edge 108 is the one that engages the upper surface of the conveyor 122 in FIG. 2. Other configurations and arrangements are possible. Among other things, the cartons 100 could be oriented or disposed differently within the shingled stream 120, for instance having an orientation where the edge 108 is the leading edge and the edge 106 is the trailing edge. Other kinds of conveyors can be used, and the conveyor 122 may not necessarily be an endless belt conveyor in all implementations. For instance, some implementations may include one or more conveyors having a series of transversally disposed spaced apart rollers. The top of these rollers then forms the equivalent of an upper surface. Other variants are possible as well.

FIG. 2 further shows that one of the cartons 100, referred to hereafter as the carton 100' for the sake of explanation, is laterally offset in position compared to the others since it extends out from a lateral side of the shingled stream 120, namely in a direction perpendicular to direction 124 in FIG. 2. The other cartons 100 have all their edges in registry with one another in this example. The edgewise offset position of the carton 100' was made on purpose at an upstream location to provide a visual indication of where a corresponding batch of cartons ends or begins, each batch including a predetermined number of cartons 100. The cartons 100 were previously counted using, for instance, an optical system or any other suitable system or method. The cartons 100 may be counted and offset in position at or near the exit of the folding-gluing machine when they are still spaced apart from one another and just before a continuous shingled stream is formed. This often makes counting cartons easier, less expensive, and more accurate than any other method of counting the cartons in a shingled stream. The batches of cartons 100 will be put into containers at the packing station. Each container will receive one or more of these batches. Ultimately, the goal is that each container holds the right number of cartons, this being generally a constant number when a same model of carton is put into containers having the same capacity. The capacity of the containers can nevertheless vary during the packing process, for instance because of a change in the size of the containers provided at the packing station or because the density of the cartons 100 in the containers is modified for some reason. The number of counted cartons 100 in each upcoming new batch can be adjusted at any time within the same shingled stream. This can be done by simply changing the number of cartons 100 between two successive edgewise offset cartons 100', and also by synchronizing a change in the size of the containers being used at the packing station with the arrival of these batches, if required. Other configurations and arrangements are possible.

Containers for receiving the cartons 100 can be shipping containers, for instance receptacles such as boxes or bins having an open side that can be closed once the cartons 100 were inserted. Other kinds of containers are possible in some implementations. A container could consist for instance of one or more straps keeping the cartons 100 together, with or without any other parts, or an envelope such as a plastic wrapping or the like. Another example can be a pallet on which the batches of cartons 100 are put, the batches being separated from one another by a corresponding spacer or by varying the orientation of adjacent batches. Many other approaches or combination of approaches are possible as well.

Figure 3:
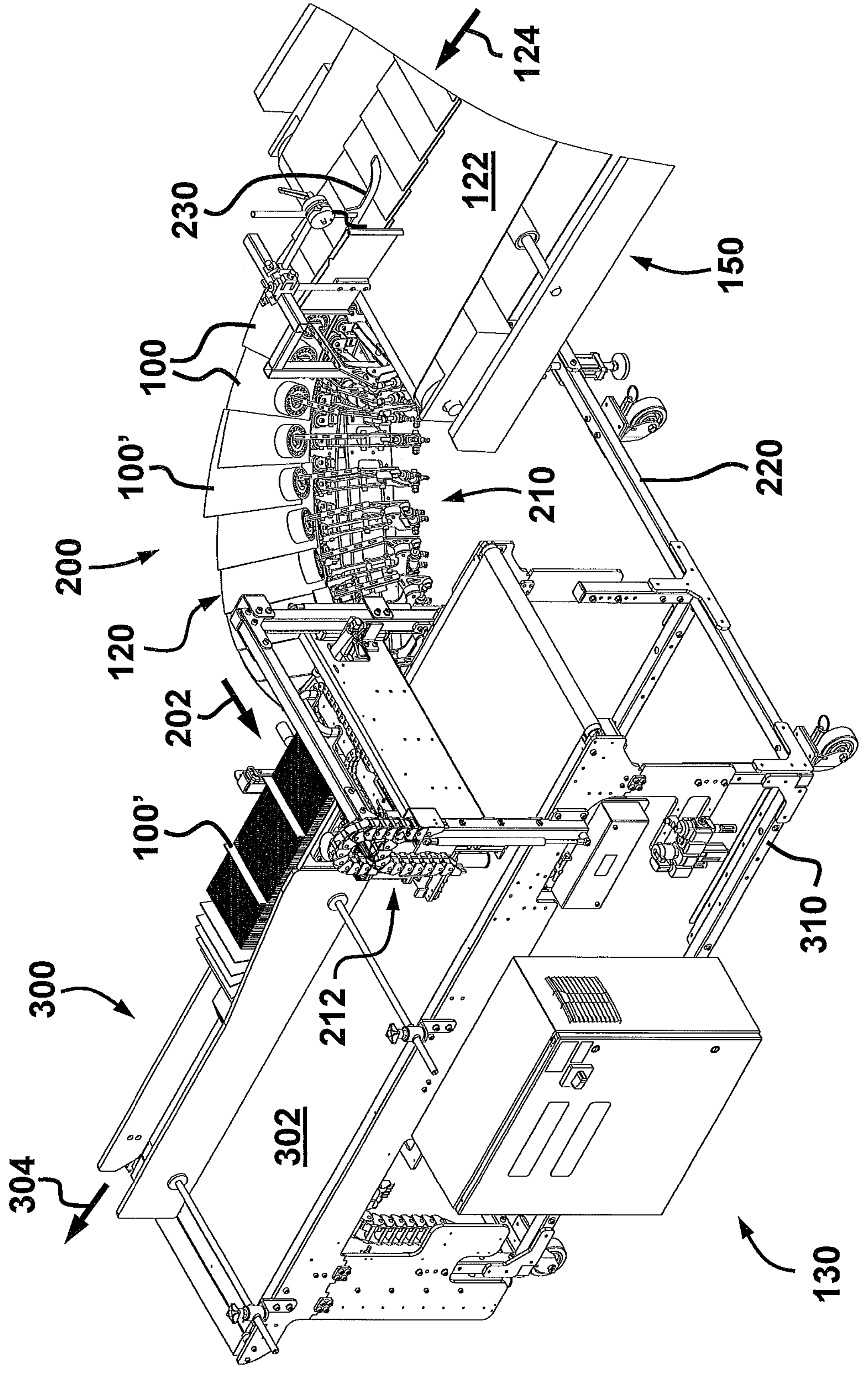
FIG. 3 is an isometric view illustrating an example of a system having an example of a repositioning station in accordance with the proposed concept.

FIG. 3 is an isometric view illustrating an example of a system 130 having an example of a repositioning station 200 in accordance with the proposed concept. It shows a continuous shingled stream 120 of overlapping cartons 100 being processed. The repositioning station 200 can have an inlet receiving the shingled stream 120 being transported on the conveyor 122, the conveyor 122 being for instance the exit of a folding-gluing machine 150. This conveyor is called hereafter the incoming conveyor 122 since it transports the cartons 100 of the shingled stream 120 towards the repositioning station 200.

Figure 8:
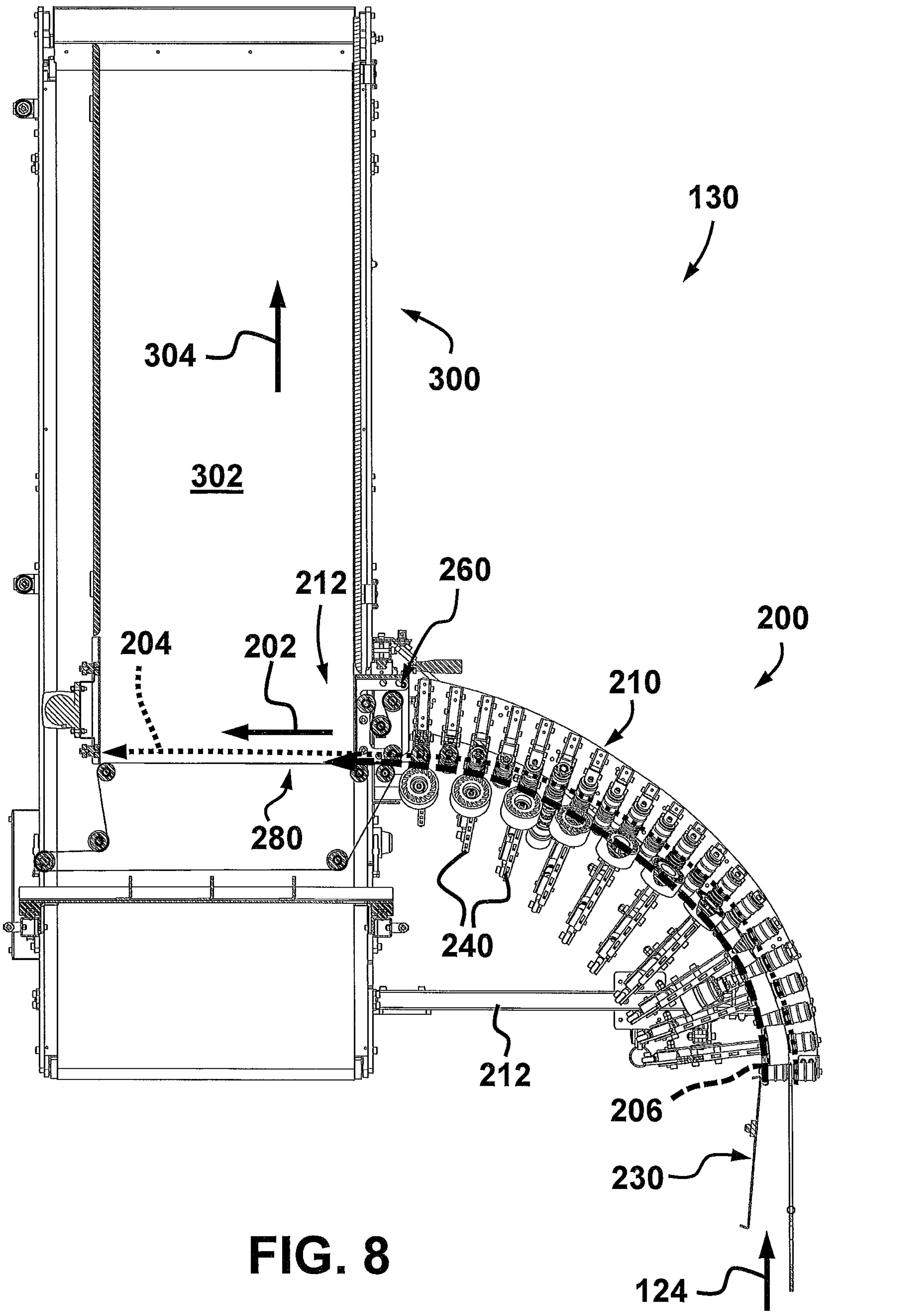
FIG. 8 is a top plan view what is shown in FIG. 7.

The repositioning station 200 allows the shingled stream 120 to be transferred onto an outgoing conveyor 302. This outgoing conveyor 302 can be part of a packing station 300, as shown in the illustrated example. The shingled stream 120 is transported through the repositioning station 200 along a transport circuit 204 (FIG. 8). Other configurations and arrangements are possible. Among other things, the folding-gluing machine 150 could be located elsewhere, and the incoming conveyor 122 may not necessarily receive cartons 100 directly from a folding-gluing machine in some implementations. Likewise, the packing station 300 could be located further downstream, or even elsewhere, and the outgoing conveyor 302 may not necessarily be part of a packing station in some implementations. Hence, the repositioning station 200 may operate without a folding-gluing machine or a packing station, or even both, being near the system 130. The repositioning station 200 could also be provided as a standalone equipment, for instance for installing it on an existing system. The incoming and outgoing conveyors 122, 302 described and illustrated herein are only examples, and the repositioning station 200 can be provided in a system where different kinds or models of conveyors are used. Other variants are possible as well.

The repositioning station 200 of FIG. 3 can be subdivided into two main sections, one being referred to as a lateral deviation assembly 210 and located at the inlet, and one being referred to as a final positioning assembly 212 and located at the outlet. The lateral deviation assembly 210 is positioned on one side of the outgoing conveyor 302 and be supported by a corresponding framework 220, which supporting framework 220 can be directly attached to the supporting framework 310 provided under the outgoing conveyor 302, as shown in the illustrated example. The final positioning assembly 212 of the repositioning station 200 can be supported by the framework 310. Other configurations and arrangements are possible. Among other things, the lateral deviation assembly 210 or the final positioning assembly 212, or even both, can be configured differently or supported using other kinds of frameworks or arrangements. Other variants are possible as well.

Figure 4:
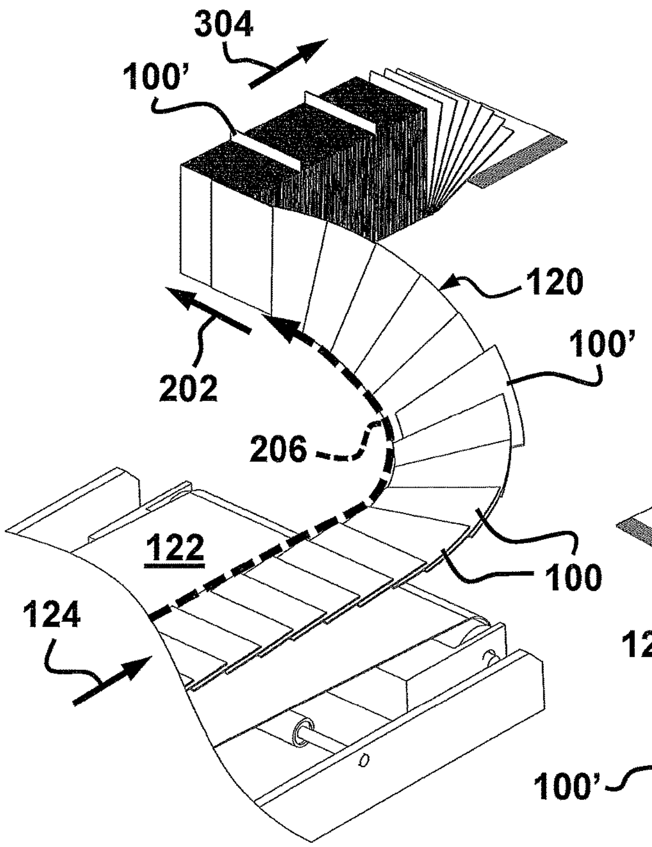
FIG. 4 is a semi-schematic isometric view illustrating how the shingled stream is transferred through the repositioning station in the system shown in FIG. 3.

FIG. 4 is a semi-schematic isometric view illustrating how the shingled stream 120 is transported through the repositioning station 200 in the system 130 shown in FIG. 3. The shingled stream 120 is thus shown without the repositioning station 200 and without the outgoing conveyor 302 for the sake of illustration. In this implementation, the shingled stream 120 veers to the left and the cartons 100 arrive on the outgoing conveyor 302 from its right-hand side to form a stack. As can be seen, the lateral offset cartons 100' are now upwardly offset cartons 100' and are still clearly marking the transitions between the batches.

Figure 5:
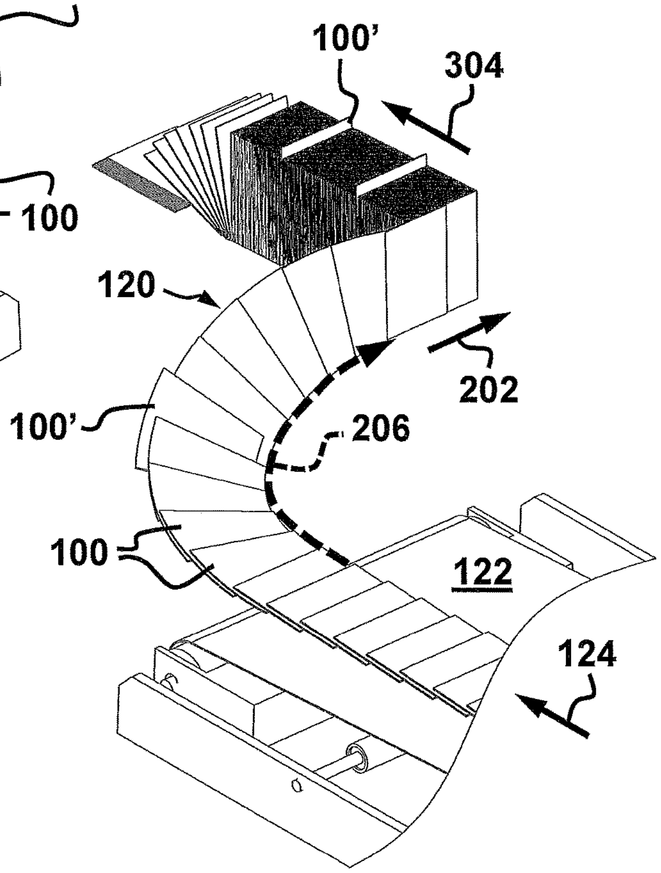
FIG. 5 is a view similar to FIG. 4 but illustrating an implementation where the shingled stream veers to the right.

FIG. 5 is a view similar to FIG. 4 but illustrating an implementation where the shingled stream 120 veers to the right.

FIGS. 4 and 5 also show that the innermost edge of the cartons 100 follows a curvilinear axis 206. The term "innermost" refers to the side of the turn. The curvilinear axis 206 can be substantially horizontal and uniplanar, as shown, and the lateral alignment of the carton 100 at the inlet can correspond to the vertical alignment at the outlet of the lateral deviation assembly 210. The curvilinear axis 206 coincides with the innermost and bottommost boundary of the transport circuit 204 (FIG. 8) throughout the lateral deviation assembly 210. Other configurations and arrangements are possible. For instance, the transport circuit 204 may include a small variation of the vertical height between its inlet and outlet ends. This variation will generally be less than a few centimeters but it could possibly be more in others, for instance to clear a local obstacle on the floor or for other reasons. Other variants are possible as well.

Figure 6:
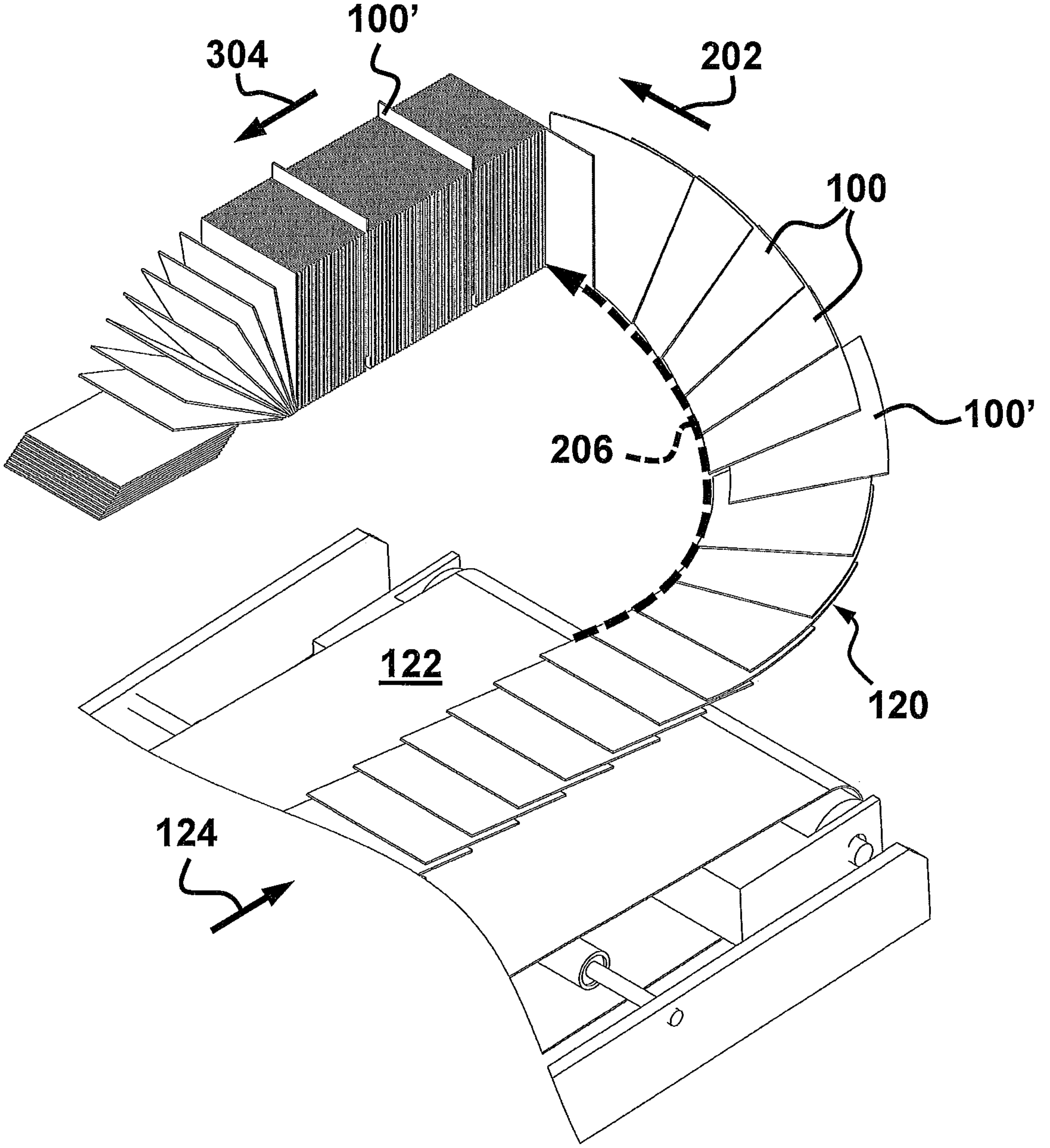
FIG. 6 is a view similar to FIG. 4 but illustrating an example of an implementation where the cartons in the shingled stream are oriented differently and where the outgoing conveyor carries the stacked cartons in a countercurrent direction.

The cartons 100 in the shingled stream 120 are in a facedown position at the inlet of the repositioning station 200. The horizontal direction 124 forms what is called hereafter the first direction. The shingled stream 120 exits the repositioning station 200 in a second horizontal direction 202 onto the outgoing conveyor 302 as they fall by gravity thereon. The cartons 100 are then being in an upright position and form a stack that is carried away upon the upper surface of the outgoing conveyor 302 advancing in a third horizontal direction 304. The incoming conveyor 122 and the outgoing conveyor 302 of FIG. 3 are laterally offset in position, and the first and third directions 124, 304 can be substantially parallel to one another. The repositioning station 200 can thus have a first section located on the side of the outgoing conveyor 302 and a second section extending across and above the outgoing conveyor 302, as shown. The cartons 100 are transported in the second direction 202 when the shingled stream 120 is in the final leg of the transport circuit 204. This second direction 202 can be substantially perpendicular to the first direction 124 and thus also to the third direction 304, as shown in the illustrated example. Other configurations and arrangements are possible. Among other things, although the first direction 124 and the third direction 304 have the same orientation in the example of FIG. 3, the third direction 304 can be countercurrent with reference to the first direction 124 in some implementations, depending for instance on how the cartons 100 are positioned in the shingled stream 120. FIG. 6 is a view similar to FIG. 4 but illustrating an example of an implementation where the cartons 100 in the shingled stream 120 are oriented differently and where the outgoing conveyor 302 carries the stacked cartons in a countercurrent direction, namely in the third direction 304. Also, the degree of precision of the perpendicularity and of the parallelism between the directions 124, 202, 304 can be relatively low and the phrases "substantially parallel" and "substantially perpendicular" cover deviations of up to about 15 degrees. In certain implementations, the deviations can be up to about 25 degrees. A repositioning station 200 could be implemented without having the first and third directions 124, 304 being parallel or even substantially parallel, or without having the second direction 202 being parallel to the first or third direction 124, 304. Other variants are possible as well.

Figure 7:
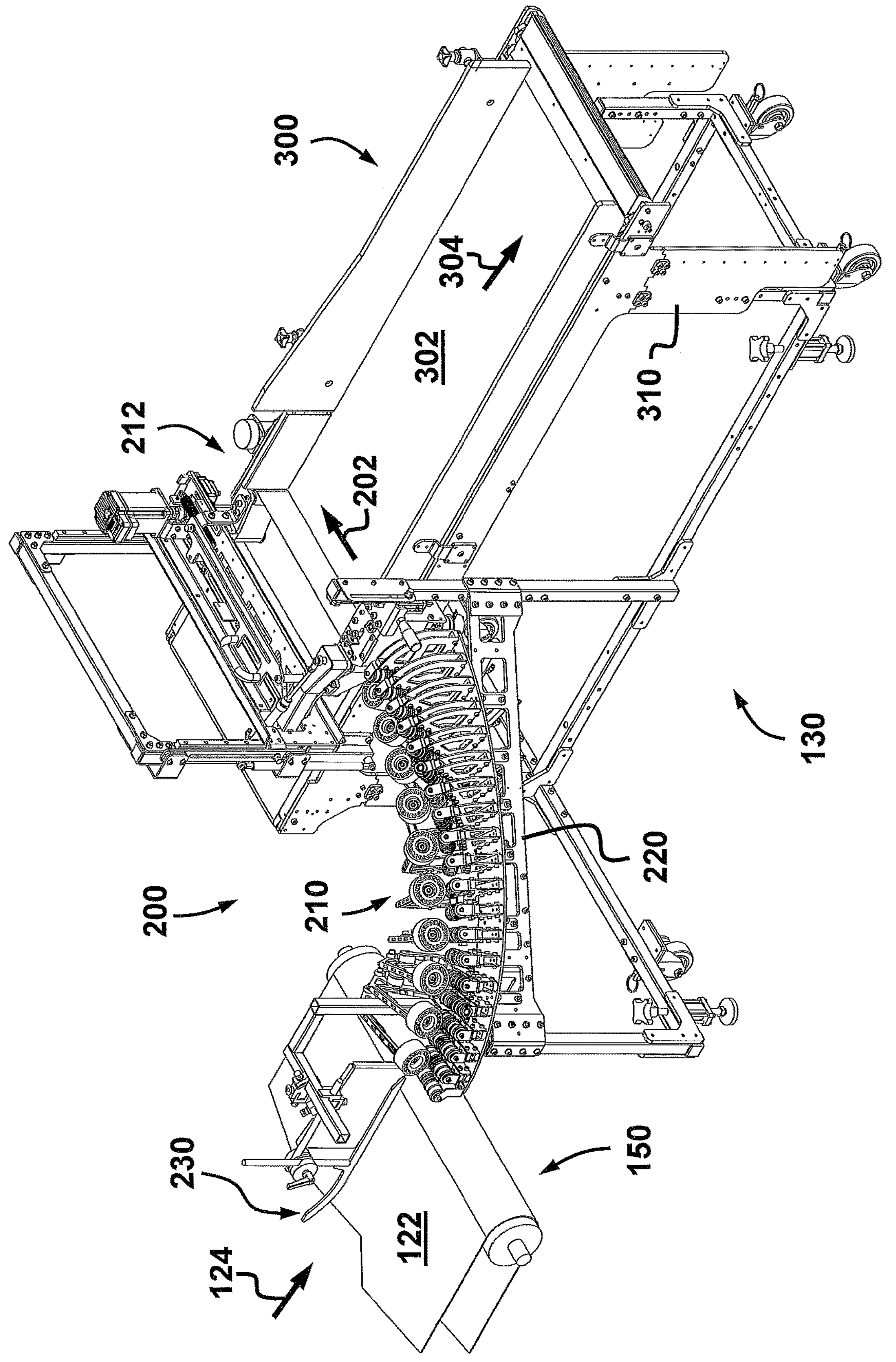
FIG. 7 is an isometric view of the system shown in FIG. 3 but taken from another viewpoint and without the shingled stream.

FIG. 7 is an isometric view of the system 130 shown in FIG. 3 but taken from another viewpoint and without the shingled stream. The shingled stream is not shown only for the sake of simplicity. The repositioning station 200 can include a lateral guiding device 230 positioned immediately upstream the inlet of the lateral deviation assembly 210, as shown. This lateral guiding device 230 can be useful to correct the position, for instance the angular position, of the incoming cartons in order to have their innermost edge in alignment with the curvilinear axis 206 at the inlet of the lateral deviation assembly 210. Only the marking cartons 100' are not aligned by the lateral guiding device 230 because their offset position is intended. They are offset towards the other lateral side. Other configurations and arrangements are possible. Among other things, the lateral guiding device 230 can be constructed or be positioned differently in some implementations. It could also be omitted in others. The repositioning station 200 can process a shingled stream 120 where no edgewise offset cartons 100' are present. Other variants are possible as well.

FIG. 8 is a top plan view of the system 130 shown in FIG. 7. As can be seen, the lateral deviation assembly 210 includes a plurality of lengthwise-disposed roller units 240 along which the transport circuit 204 follows a generally ellipsoidal deviation path to veer the shingled stream 120 from the first direction 124 to the second direction 202 while simultaneously pivoting the cartons 100 from the facedown position to the upright position. Other configurations and arrangements are possible.

It should be noted that unlike existing handling systems, the position of the shingled stream 120 within the illustrated repositioning station 200 is not based on the geometric center of the cartons 100. It is based instead on the innermost boundary of the transport circuit 204. This feature can greatly simplify the settings to be made in the transition from one model of carton to another when the two models have dissimilar widths since the innermost boundary of the transport circuit 204 can remain the same. Furthermore, because the cartons 100 are repositioned simultaneously about two axes, the transport circuit 204 can be made shorter, thereby minimizing the required floor space of the equipment. Variants are possible as well.

Figure 9:
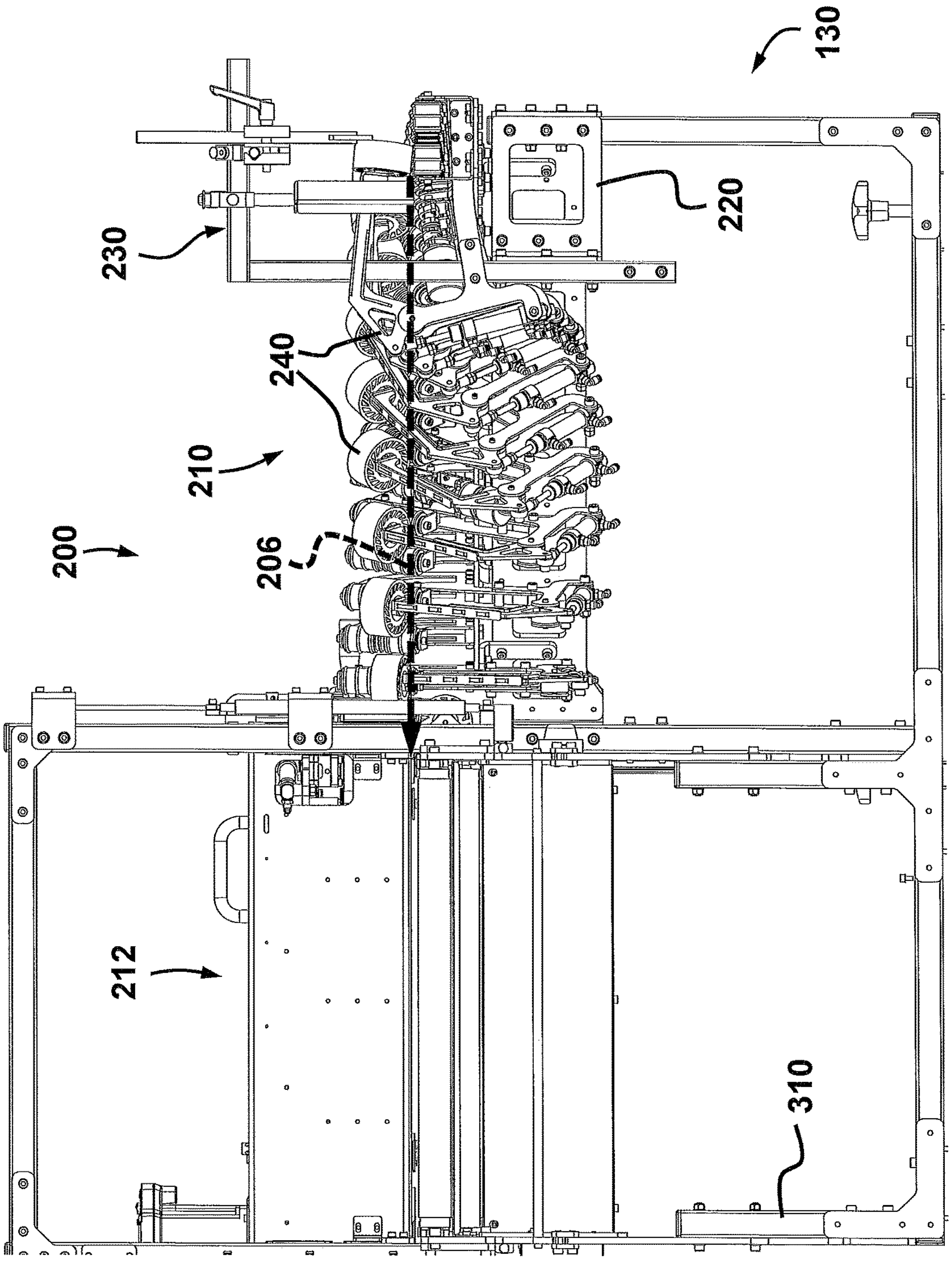
FIG. 9 is a side view of what is shown in FIG. 7, as viewed from the inlet of the repositioning station.

FIG. 9 is a side view of what is shown in FIG. 7, as viewed from the inlet of the repositioning station 200. The figure shows that the curvilinear axis 206 is this example is horizontal.

Figure 10:
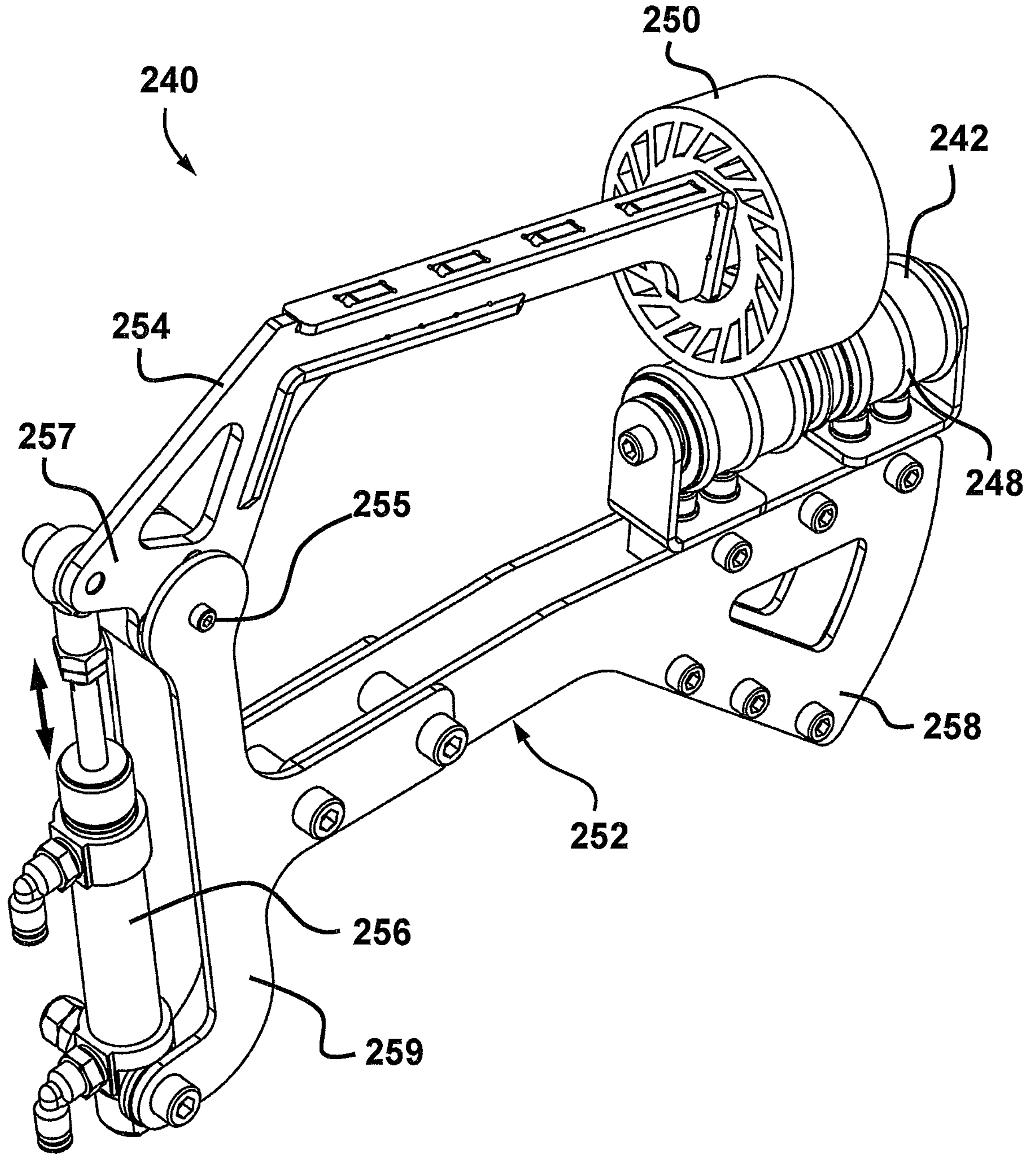
FIG. 10 is an enlarged isometric view illustrating a portion of one of the roller units provided along the lateral deviation assembly of the repositioning station shown in FIG. 7.

FIG. 10 is an enlarged isometric view illustrating a portion of one of the roller units 240 provided along the lateral deviation assembly 210 of the repositioning station 200 shown in FIG. 7.

Each roller unit 240 can include one or more motorized underside rollers 242 which can be collectively driven by one or more electric motors 244, as shown in the illustrated example. Some of the rollers 242 can be directly driven through a direct coupling while adjacent ones are indirectly driven using endless belts running from one roller 242 to another and passing for instance through driving grooves 246 made on each roller 242, as shown. There are two spaced-apart electric motors 244 for driving the underside rollers 242 in the illustrated example, as shown for instance in FIGS. 12 and 13. This configuration was found to be adequate in this implementation for generating the required torque for the roller units 240 in the lateral deviation assembly 210. Adding more electric motors would generally not yield significant benefits justifying the additional costs involved. Other configurations and arrangements are nevertheless possible. Among other things, other kinds of rollers, motors or linkages can be used. Other variants are possible as well.

Each underside roller 242 can include multiple peripheral rings 248 that are spaced apart along each of them, as shown in the illustrated example. These rings 248 can be made of a rubbery material or any other one that can increase the friction with the outer surface of the cartons 100. This can improve the driving contact and can mitigate the risks of damaging the cartons 100 or leaving a mark thereon. Other configurations and arrangements are possible. Among other things, this feature can be unnecessary in some implementations and could thus be omitted entirely. Other variants are possible as well.

Each roller units 240 can further include an overhead roller 250 positioned above one or more corresponding underside rollers 242, as shown for instance in the illustrated example. The overhead rollers 250 can apply a force on the topside of the cartons 100 passing through the lateral deviation assembly 210. Each overhead roller 250 can be part of a biasing arrangement 252 maintaining the shingled stream 120 in driving engagement with the underside roller 242. The biasing arrangement 252 can also include a cantilevered support arm 254 and a pneumatic actuator 256 that is configured and disposed to urge the corresponding overhead roller 250 towards the corresponding underside roller or rollers 242, as shown in the illustrated example. The support arm 254 can pivot about a corresponding pivot axis 255. One end of the actuator 256 can be pivotally attached to a side extension 257 at a rear end of the support arm 254. The pressure in each actuator 256 can be controlled using one or more pneumatic pressure regulators or the like. Adjustments to change the kinds of cartons being handled are generally quick and straightforward with a pneumatic force-generating system. The underside roller 242 of the roller unit 240 can be supported using a holding member 258, as shown. The holding member 258 can be mechanically connected to the other parts of the roller unit 240 through a main bracket 259, which main bracket 259 is also where the support arm 254 is pivotally attached. Other configurations and arrangements are possible. Among other things, mechanical springs or the like could be used. The force-generating mechanism could be based only on the gravitational force, for instance using balanced weights at least for some of the roller units 240. Different kinds of mechanisms can be present in a same lateral deviation assembly 210. The various rollers can be constructed and arranged differently. The construction and configuration of the components such as the support arm 254, the holding member 258 and the main bracket 259, among other things, can be different. Some of these components can be omitted, replaced with other kinds of components, or integrated with other components, for instance. Other variants are possible as well.

Each overhead roller 250 can be made of a relatively malleable material, with multiple voids, as shown in the illustrated example. This construction is known as a no-crush wheel and the overhead roller 250 can generally be pressed against the cartons 100 without causing physical damage or visual marking. Other configurations and arrangements are possible. Among other things, the overhead rollers 250 can be made of other materials and no include voids. The diameter and width of the overhead rollers 250 can be different, for instance larger, compared to what is shown. Other variants are possible as well.

It should be noted that FIG. 10 shows only a portion of a roller unit 240 since in the illustrated example, there is one overhead roller 250 between two underside rollers 242. In other words, a roller unit 240 can include two underside rollers 242 and one overhead roller 250, as shown. The overhead roller 250 can be at a median position with reference to the two corresponding underside rollers 242. Having fewer overhead rollers 250 than underside rollers 242 reduces the part counts, thereby lowering the manufacturing costs and complexity. Other configurations and arrangements are nevertheless possible. Among other things, the exact position of the overhead rollers 250 with reference to the corresponding underside rollers 242 can be different. Using proportionally more or less overhead rollers 250 is also possible, although using fewer overhead roller units 240, for instance one for every three underside rollers 242, can further decrease the manufacturing costs but could create complications in the handling of the shingled stream 120 in some situations and could increase the risks of having some cartons 100 sliding down near the end of the lateral deviation assembly 210. Different configurations of roller units 240 can be present along a same lateral deviation assembly 210. Other variants are possible as well.

Figure 11:
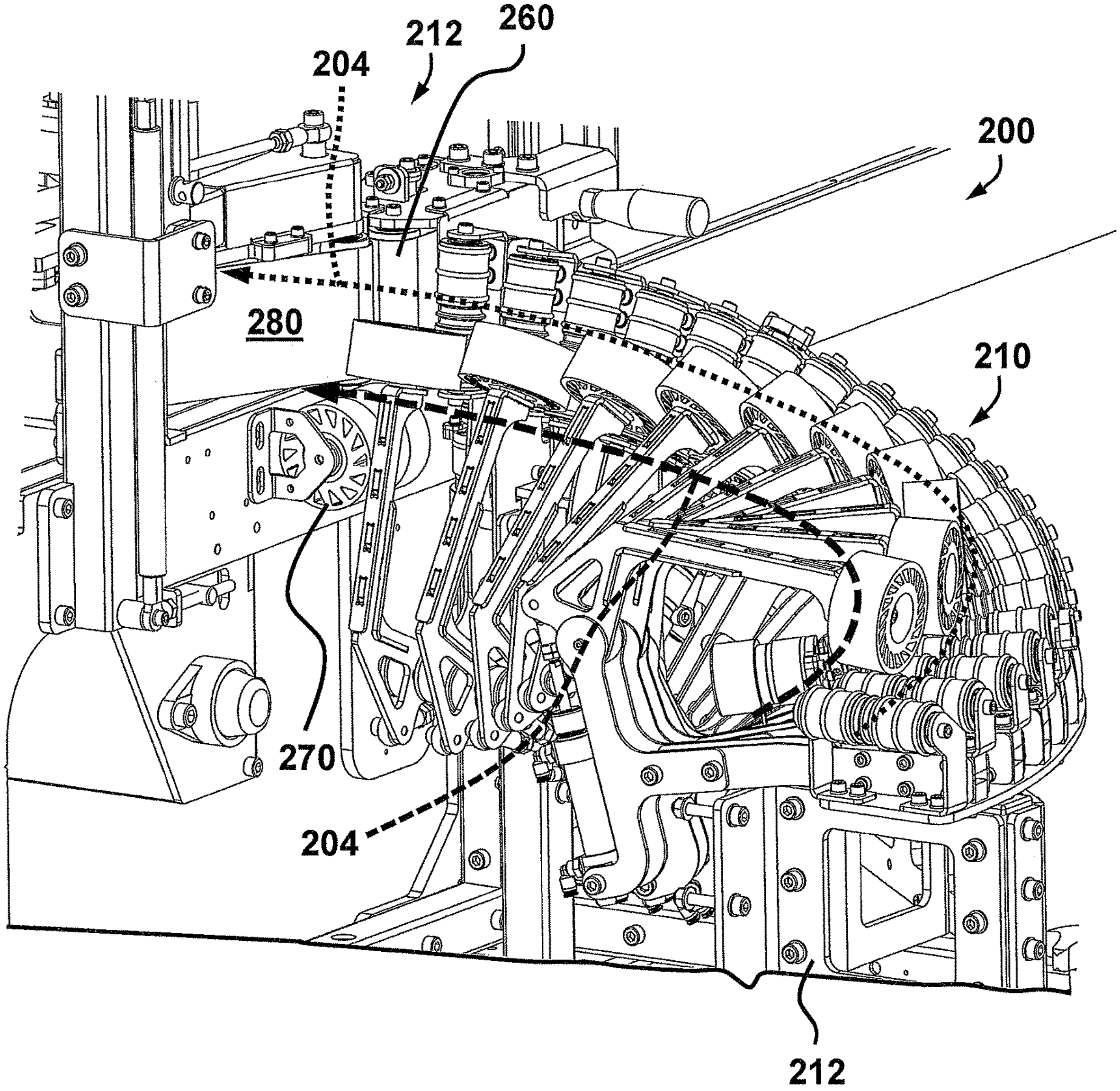
FIG. 11 is an enlarged isometric view of the repositioning station shown in FIG. 7.

FIG. 11 is an enlarged isometric view of the repositioning station 200 shown in FIG. 7. This figure shows the transition from the lateral deviation assembly 210 to the final positioning assembly 212. The lateral deviation assembly 210 ends with the last underside roller 242. The final positioning assembly 212 can include a first transfer unit 260 driving one side of the cartons 100 when they are in an upright position. It can also include a bottom roller 270 to guide the innermost side of the cartons 100, coming along the curvilinear axis 206, over the side edge of the outgoing conveyor 302, as shown, just in case some of them are too low for some reason. The final positioning assembly 212 can further include a second transfer unit 280 driving the other side of the cartons 100 in the final leg of the transport circuit 204, as shown. Other configurations and arrangements are possible. Among other things, the first transfer unit 260 and the second transfer unit 280 can be configured and arranged differently. They can be replaced by another arrangement in some implementations. The bottom roller 270 can be positioned and configured differently, or it can be replaced by a curved or inclined surface or the like, or even be omitted in some implementations. Other variants are possible as well.

Figure 12:
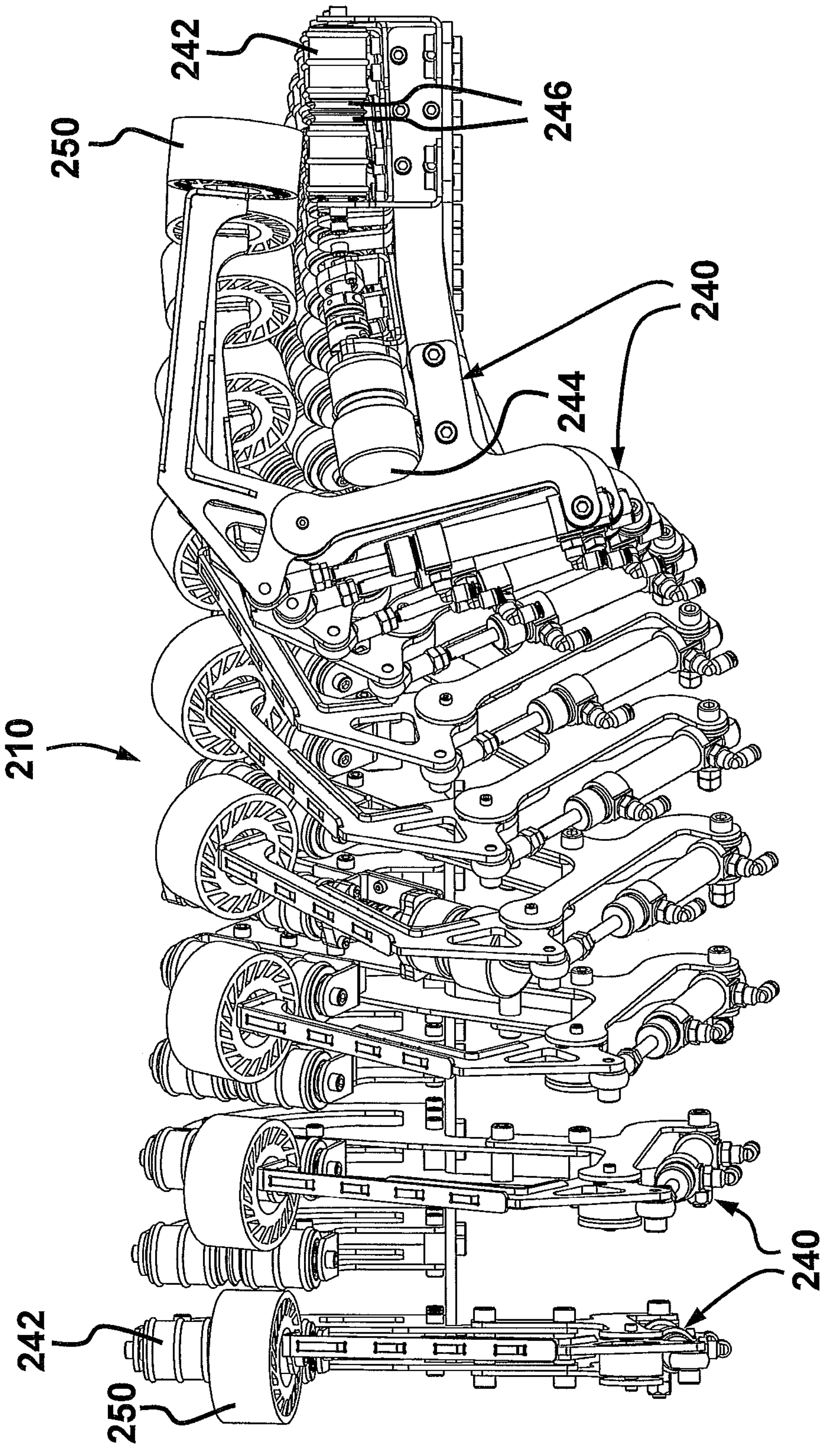
FIG. 12 is a side view illustrating only the lateral deviation assembly of the repositioning station shown in FIG. 7.
Figure 13:
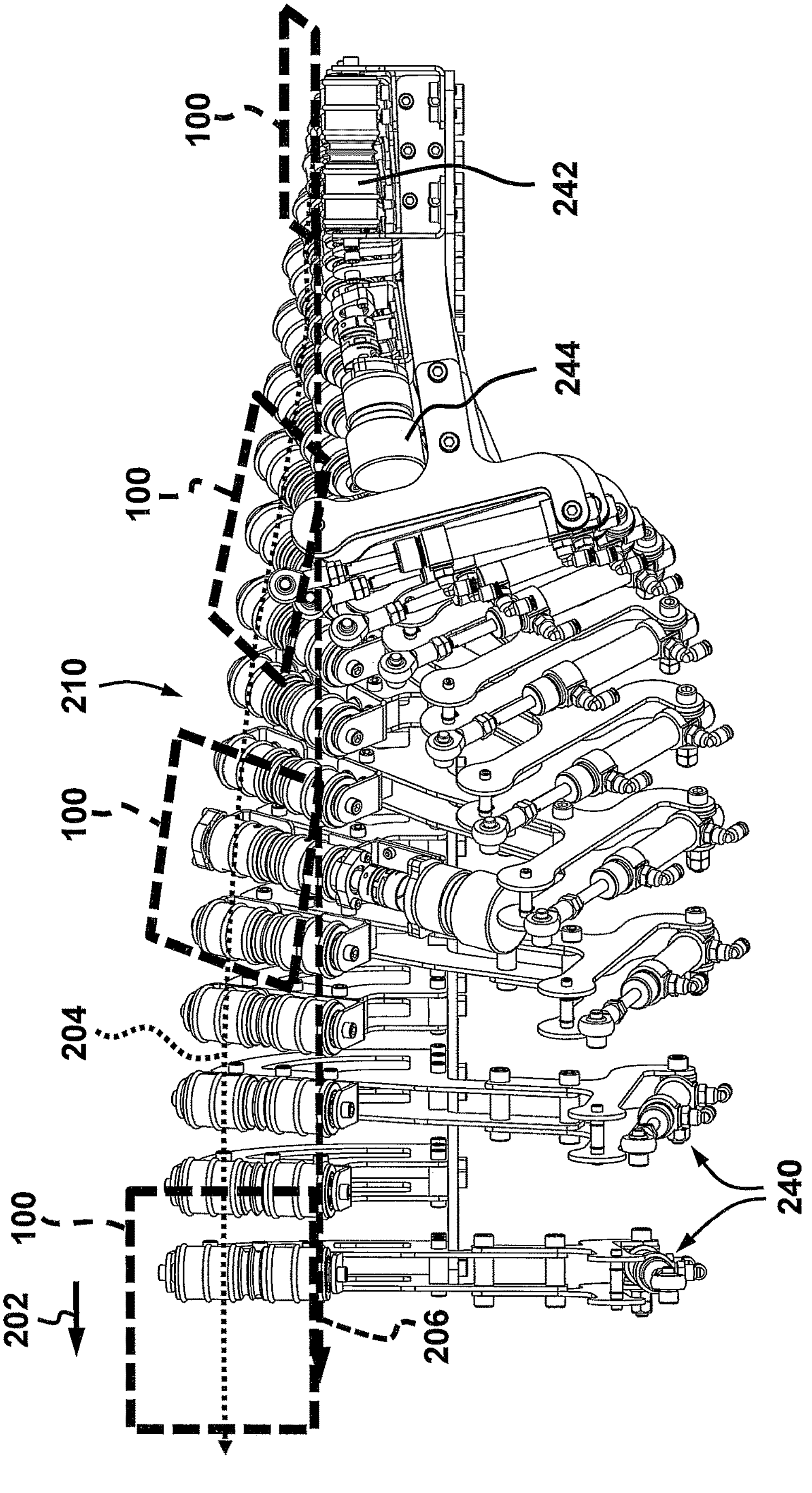
FIG. 13 is a view similar to FIG. 12 but without the overhead rollers and the support arms of the roller units.
Figure 14:
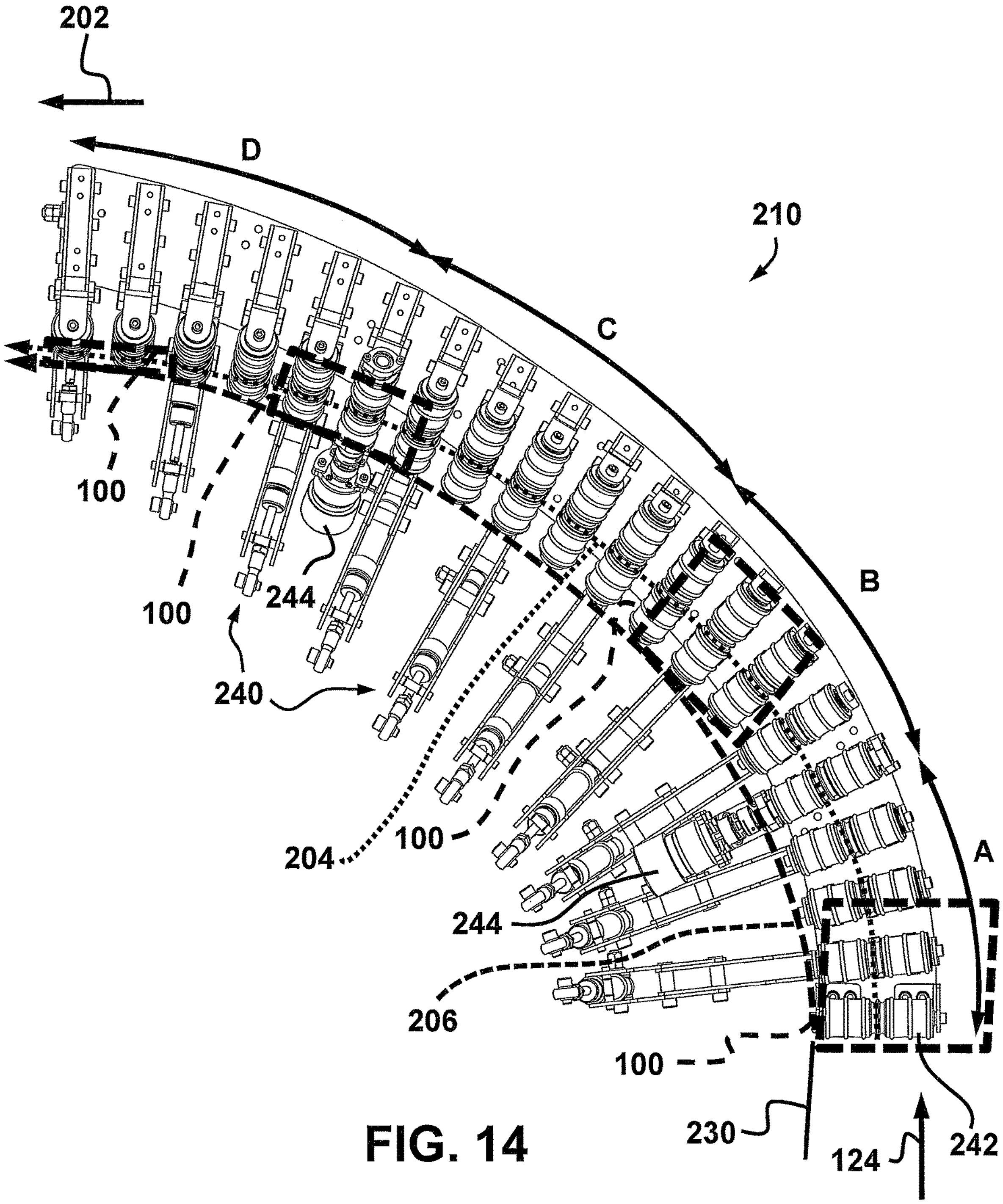
FIG. 14 is a top plan view of what is shown in FIG. 13.

FIG. 12 is a side view illustrating only the lateral deviation assembly 210 of the repositioning station 200 shown in FIG. 11. FIG. 13 is a view similar to FIG. 12 but without the overhead rollers 250 and the support arms 254 of the roller units 240. FIG. 14 is a top plan view of what is shown in FIG. 13.

FIGS. 13 and 14 schematically show cartons 100 within the shingled stream 120 at different stages along the transport circuit 204 passing therein, where the cartons 100 start in a facedown position at the inlet and end in an upright position at the outlet. As aforesaid, the cartons 100 of the shingled stream 120 passing through the lateral deviation assembly 210, following the portion of the transport circuit

204 therein, will transition from the facedown position to the upright position. They will also simultaneously veer from the first direction 124 to the second direction 202 along the way. The pivot motion from the facedown position to the upright position can be over about 90 degrees, as shown in the illustrated example. Likewise, the change of direction about a vertical axis can be a pivot motion over about 90 degrees, as shown. The lateral deviation assembly 210 thus causes the shingled stream 120 to follow a generally ellipsoidal deviation path along the transport circuit 204. Other configurations and arrangements are possible. Among other things, the parallelism of the inner edge of the cartons 100 and the curvilinear axis 206 needs not necessarily to be perfect. An average misalignment up to about 25 degrees can generally be acceptable. Some models of cartons 100 coming out of a folding-gluing machine could sometimes have an average misalignment of more than 25 degrees, and this is one circumstance where having the lateral guiding device 230, or an equivalent, could be useful. An excessive misalignment could otherwise cause undesirable reliability issues in some implementations. The vertical height of the upper surface at the end of the incoming conveyor 122 being about the same as the upper surface of the outgoing conveyor 302, and the curvilinear axis 206 being substantially horizontal and uniplanar in the example, the position of the innermost edge of the cartons 100 can be set so that this edge will arrive just a few millimeters or even less above the upper surface over the outgoing conveyor 302 at the outlet of the lateral deviation assembly 210. This alignment of the innermost edge of the cartons 100 at the inlet of the lateral deviation assembly 210 can correspond to the output height of the vertically oriented cartons 100 at the outlet of the lateral deviation assembly 210. In the example illustrated in FIG. 14, if the lateral guiding device 230 was positioned too far on the left, the curvilinear axis 206 could end up below the upper surface of the outgoing conveyor 302, causing the leading edge 106 of the cartons 100 to potentially collide with the side of the outgoing conveyor 302. On the other hand, if the lateral guiding device 230 was positioned too far to the right in FIG. 14, the curvilinear axis 206 could end up too far above the upper surface of the outgoing conveyor 302, thereby causing the position of the offset cartons 100' to become indistinguishable from the adjacent ones when a stack is formed on the outgoing conveyor 302 in some implementations. Thus, the lateral guiding device 230 can also serve as a device for adjusting the output height at the outlet of the lateral deviation assembly 210. It can nevertheless be omitted in some implementations, as aforesaid.

FIG. 14 shows the transport circuit 204 within the lateral deviation assembly 210 of the illustrated example being divided approximately into four sequential sections A, B, C, D. These sections are only for the sake of explanation. As shown, the carton 100 can pivot about a vertical axis at an increased rate in section A compared to that in the subsequent ones, in particular sections C and D. However, the carton 100 can pivot about the curvilinear axis 206 at a lower rate in section A and the rate can progressively increase thereafter in the subsequent ones. The configuration may vary from one implementation to another but in many instances, initially having an increased pivoting rate of the cartons 100 about a vertical axis at the beginning and pivoting the cartons 100 about the curvilinear axis 206 for the transition from the facedown position to the upstanding position at a rate that increases towards the end can minimize the floor space. Other configurations and arrangements are possible. Among other things, the sections can be configured differently. Other variants are possible as well.

Figure 15:
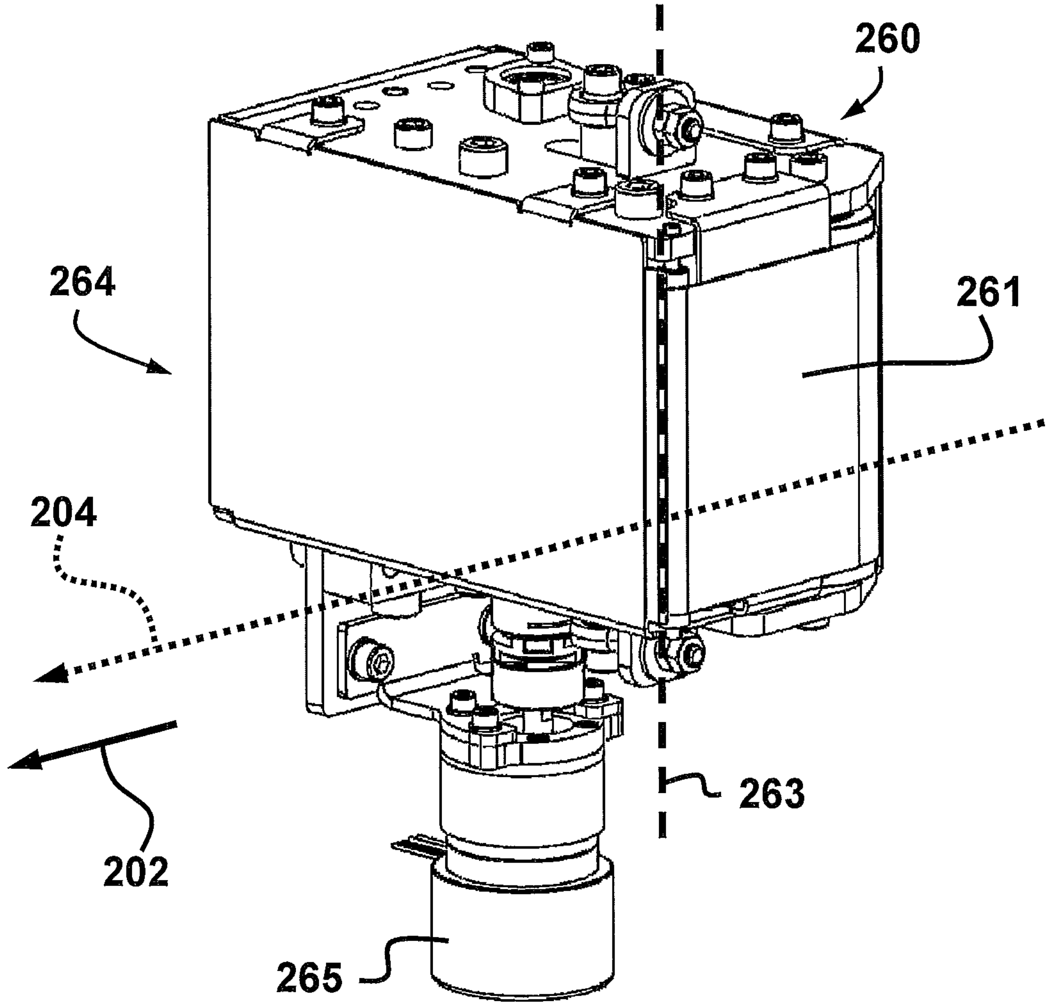
FIG. 15 is an isometric view illustrating the first transfer unit of the repositioning station shown in FIG. 7.

FIG. 15 is an isometric view illustrating the first transfer unit 260 of the repositioning station 200 shown in FIG. 7. This first transfer unit 260 drives one side of the shingled stream 120 onto the upper surface of the outgoing conveyor 302 at the outlet of the lateral deviation assembly 210. It is provided on the same side as the rollers 242. The first transfer unit 260 can include a vertically disposed endless belt 261. In the example, only a planar section of the belt 261 is exposed and engages the shingled stream 120. The belt 261 is supported by a plurality of rollers mounted inside the casing of the first transfer unit 260. As can be seen, the first transfer unit 260 is configured and disposed so as to have a very small radius at the corner 263. The belt 261 can be supported near this corner 263 using a roller having a very small radius. This allows the corner 263 to be practically at a right angle. This can be useful to minimize potential contacts with the trailing edge of the cartons 100 arriving on the outgoing conveyor 302. The belt 261 of the first transfer unit 260 can be driven by a corresponding motor, for instance an electric motor. Other configurations and arrangements are possible. The first transfer unit 260 can be constructed differently, for instance without an endless belt. Another kind of motor can be used. Other variants are possible as well.

Figure 16:
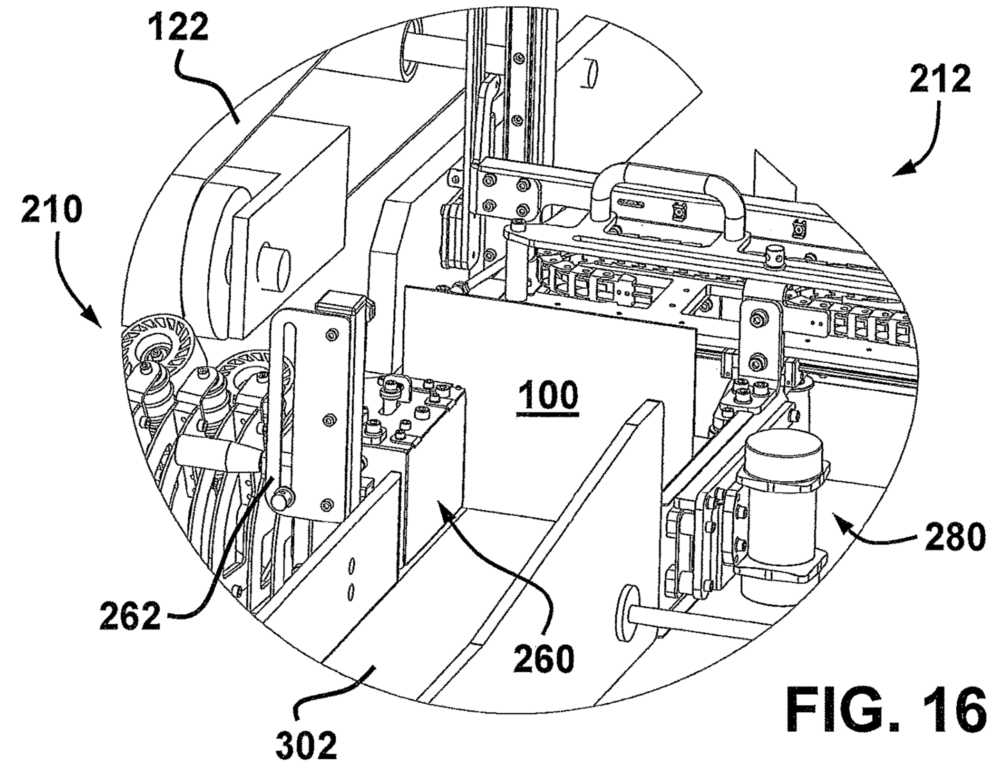
FIG. 16 is an enlarged isometric view illustrating the final positioning assembly of the repositioning station shown in FIG. 7.

FIG. 16 is an enlarged isometric view illustrating the final positioning assembly 212 of the system 130 shown in FIG. 7 with a single carton 100 being present next to the first transfer unit 260 for the sake of illustration. The first transfer unit 260 is vertically positioned close to the upper surface of the outgoing conveyor 302 in this example.

Figure 17:
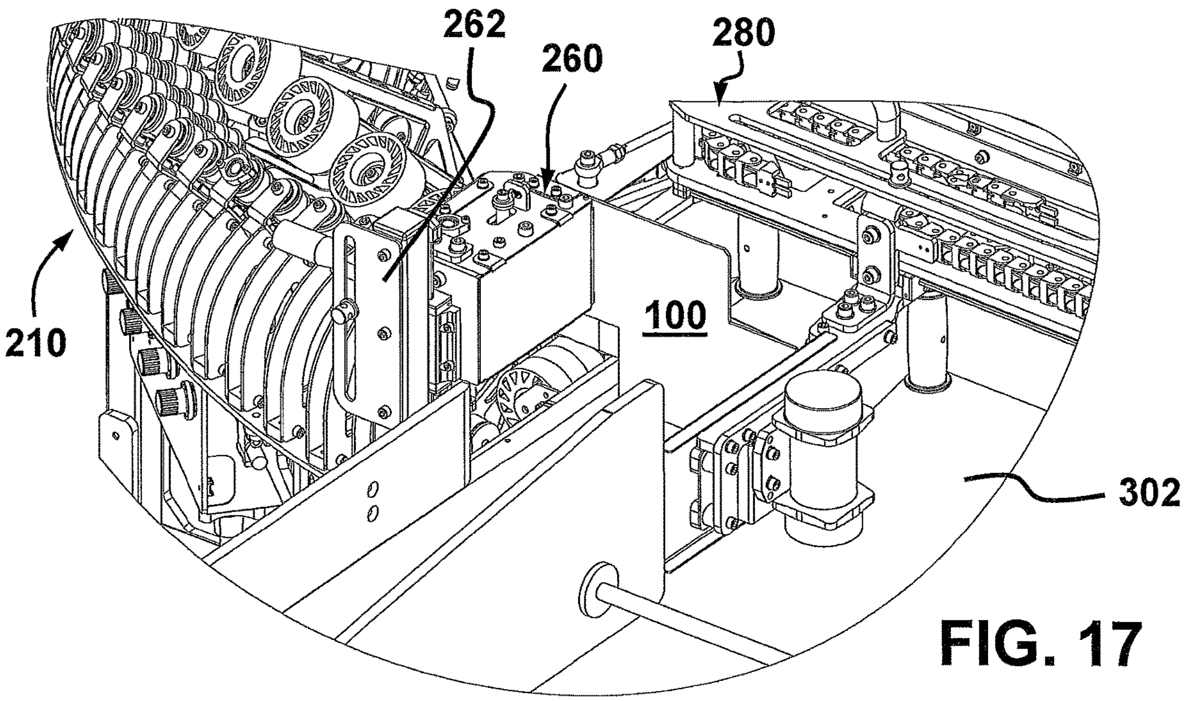
FIG. 17 is a view similar to FIG. 16 but where the first transfer unit is set at a different vertical position.

FIG. 17 is a view similar to FIG. 16 but where the first transfer unit 260 is set at a higher vertical position to handle a different model of carton 100. It is at a higher position because of the presence of a void at the bottom end in this model of carton. The higher position will allow each carton 100 to be in contact with the first transfer unit 260 over a longer distance. The vertical position was adjusted in this example using a slotted bracket 262 as well as a corresponding locking arrangement. Other configurations and arrangements are possible. Among other things, other systems for adjusting the vertical position of the first transfer unit 260 can be used. This kind of adjustment can also be absent in some implementations. Other variants are possible as well.

Figure 18:
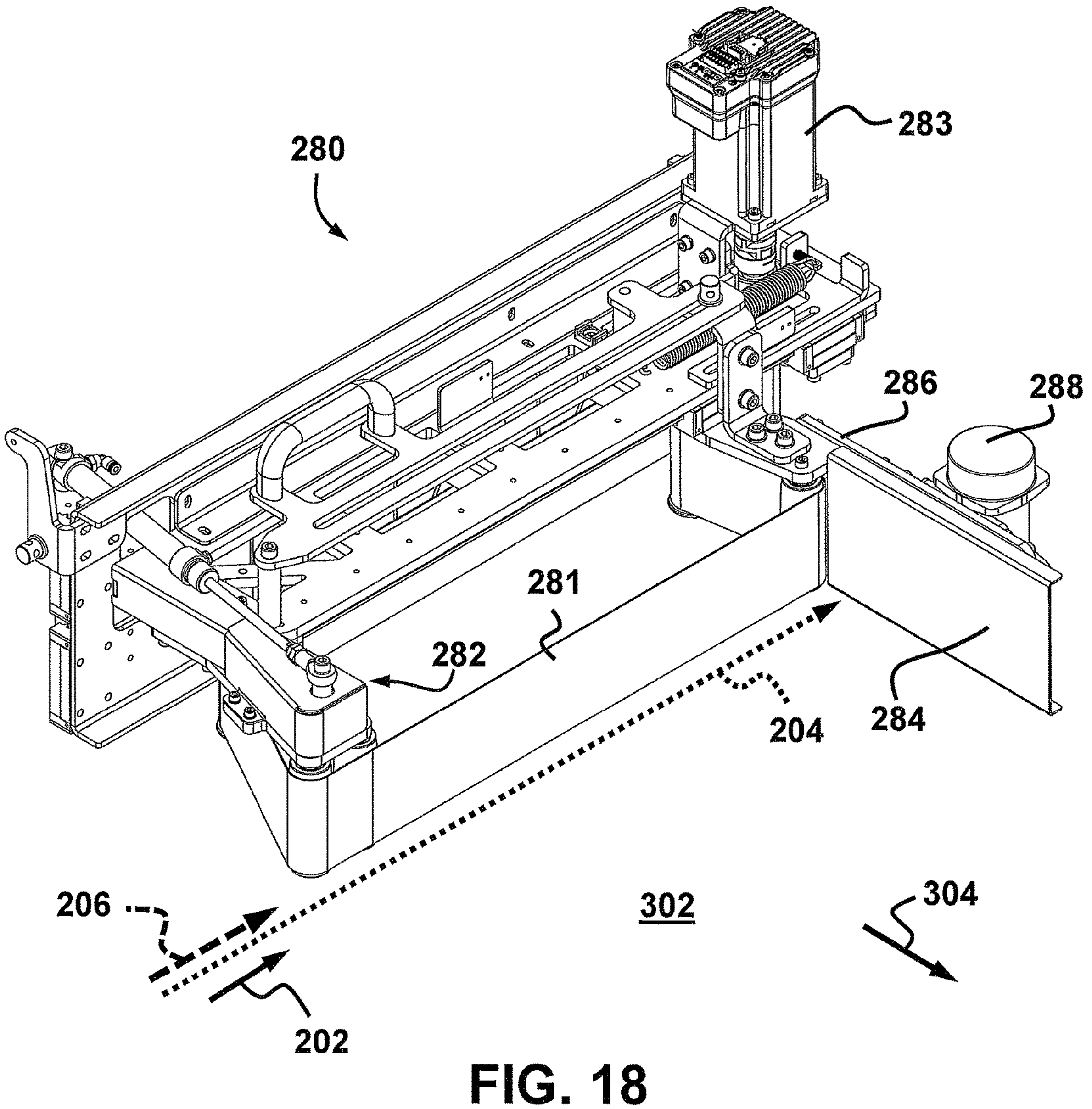
FIG. 18 is an isometric view illustrating the second transfer unit of the repositioning station shown in FIG. 7.
Figure 19:
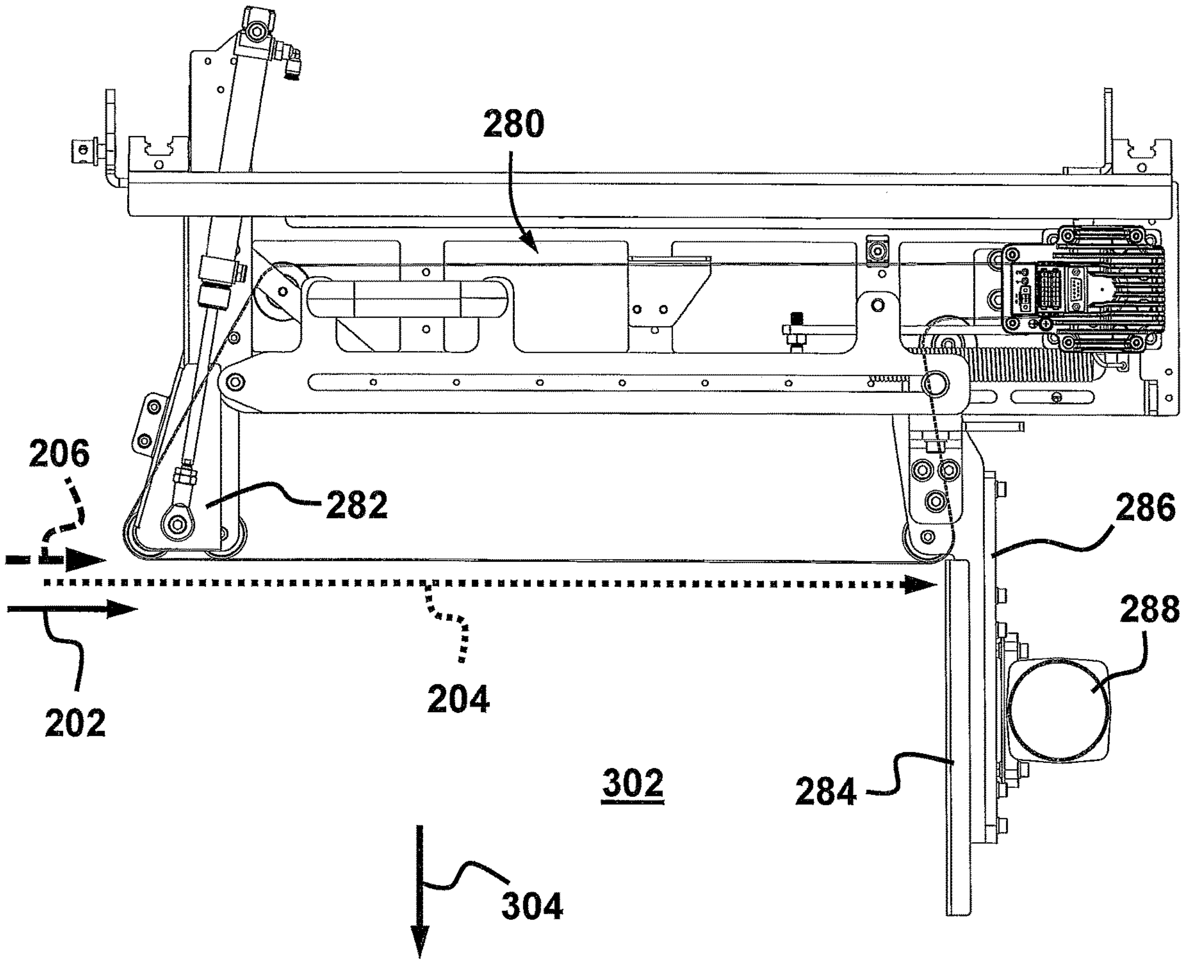
FIG. 19 is a top plan view of what is shown in FIG. 18.

FIG. 18 is an isometric view illustrating the second transfer unit 280 of the repositioning station 200 shown in FIG. 7. FIG. 19 is a top plan view what is shown in FIG. 18. The second transfer unit 280 can transport the cartons 100 across the width of the outgoing conveyor 302 until their leading edge impinges on an end plate 284. This end plate 284 can be part of a plate assembly 286. This second transfer unit 280 can thus be useful to ensure that the cartons 100 will reach the desired position on the outgoing conveyor 302. The second transfer unit 280 can include a vertically disposed endless belt 281, as shown. This belt 281 is supported using a plurality of rollers. These rollers are mounted on a support structure. The belt 281 is driven by a motor 283, for instance an electric motor or the like. Other configurations and arrangements are possible. At least some of these parts can be designed differently, or even be omitted in some implementations. Other kinds of motors can be used. Other variants are possible as well.

The second transfer unit 280 can include an exit roller and plate assembly 286, as shown. It can form the end of the transport circuit 204 where the forward movement of the shingled stream 120 is interrupted and transfers to a movement in the third direction 304. The exit roller and plate assembly 286 can move on a parallel axis along the transport circuit 204 and can be adjusted to the length of the carton 100. The opening between the end plate 284 and the entry plate 264 correspond to the length of the cartons 100 plus an extra gap to mitigate the risks of jams. The end plate 284 receives the edges of the cartons 100 and can be mounted on a mechanically isolated part to which a vibrating device 288 is attached. The vibrations of the end plate 284 can help having a smooth transition of the shingled stream 120 from the second direction 202 to the third direction 304. Other configurations and arrangements are possible. Among other things, one or more of the features presented herein can be constructed differently or be omitted entirely in some implementations. Other variants are possible as well.

The second transfer unit 280 can include an entry roller assembly 282 having a planar section where the belt 281 running through the second transfer unit 280 will be directly facing the belt of the first transfer unit 260. This entry roller assembly 282 can also be configured for moving laterally, thereby dynamically changing the position of the planar section based on the thickness of the shingled stream 120. It can include, among other things, a pneumatic actuator in which the pressure can be set to maintain the appropriate force. One side of the shingled stream 120 may have a relatively uneven profile and this side can be the one facing the underside rollers 242 and then the first transfer unit 260. The shingled stream 120 may have an opposite side with height variations due to the carton geometry and to the pitch of the shingled stream 120. This side will be the one engaged by the overhead rollers 250. These overhead rollers 250 can shift in position and the entry roller assembly 282 can also adjust the position of the planar section to follow the height variations of this side of the shingled stream 120. Other configurations and arrangements are possible. Some of these features can be omitted in some implementations. Other variants are possible as well.

Figure 20:
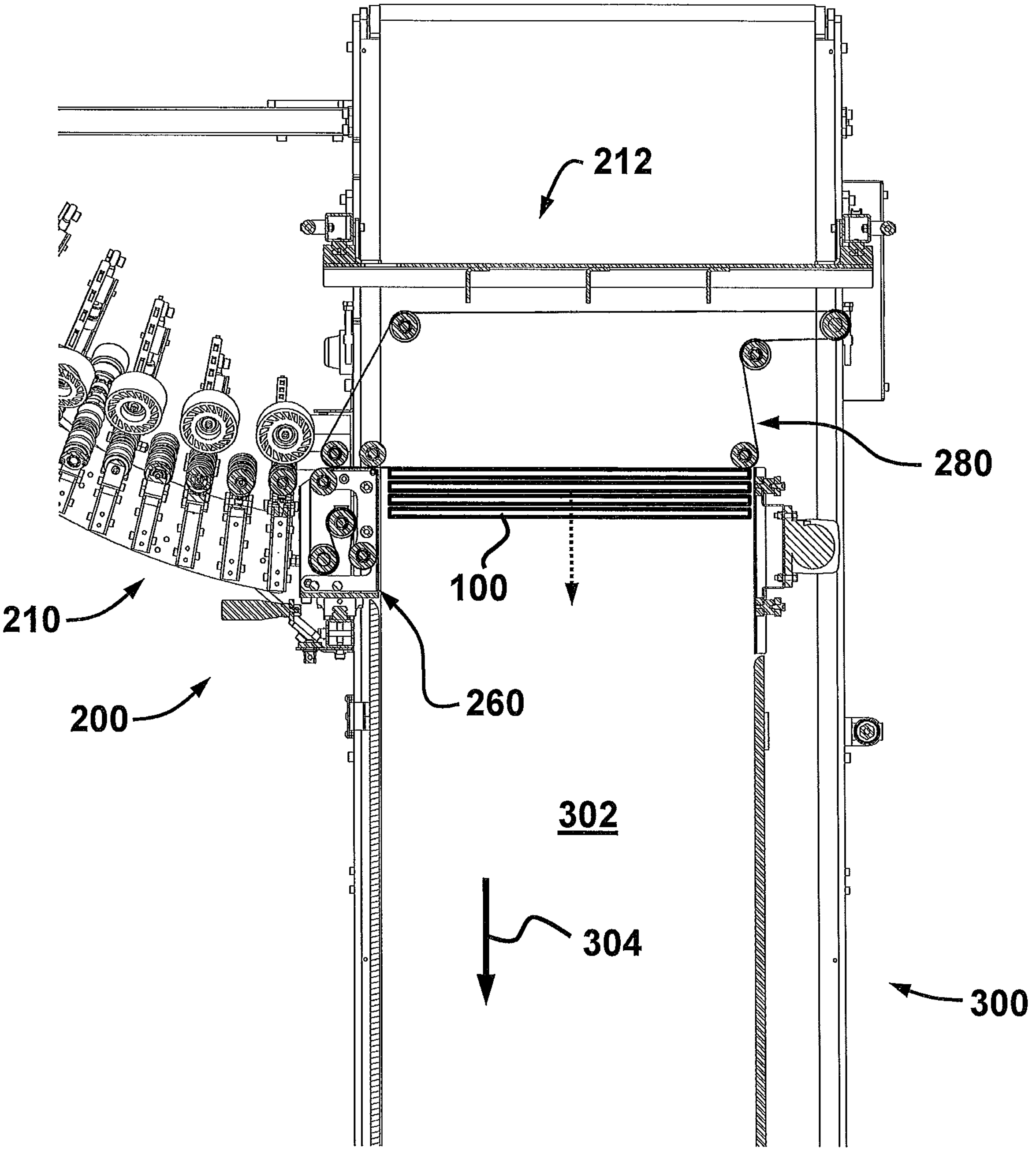
FIG. 20 is a top plan view depicting an example where some cartons form a stack on the outgoing conveyor in the repositioning station shown in FIG. 7.
Figure 21:
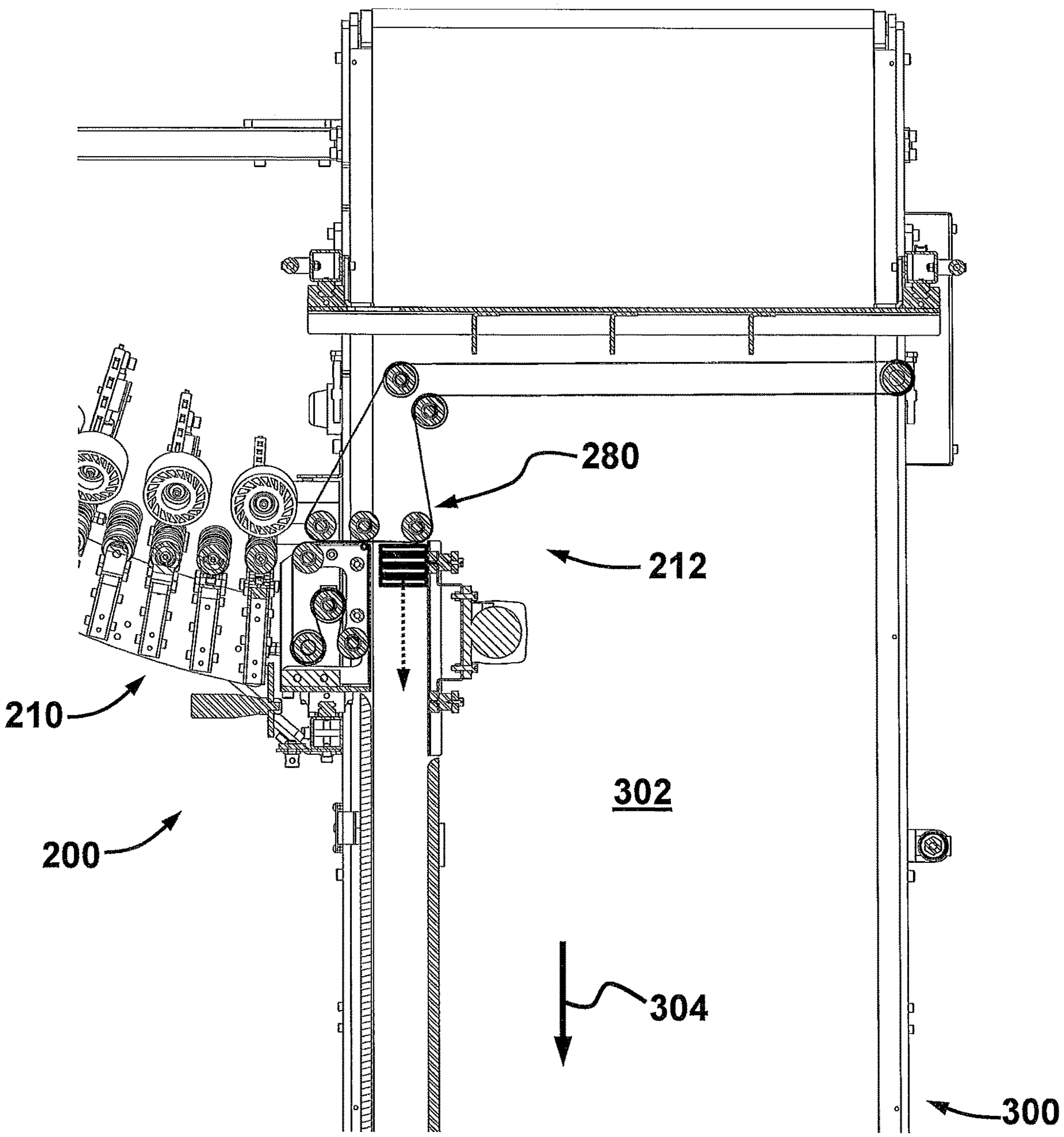
FIG. 21 is a view similar to FIG. 20 but where significantly narrower cartons are used for the sake of illustration.

FIG. 20 is a top plan view depicting an example where a few cartons 100 form a stack on the outgoing conveyor 302 at the end of the repositioning station 200 shown in FIG. 7. FIG. 21 is a view similar to FIG. 20 but with significantly narrower cartons 100.

Figure 22:
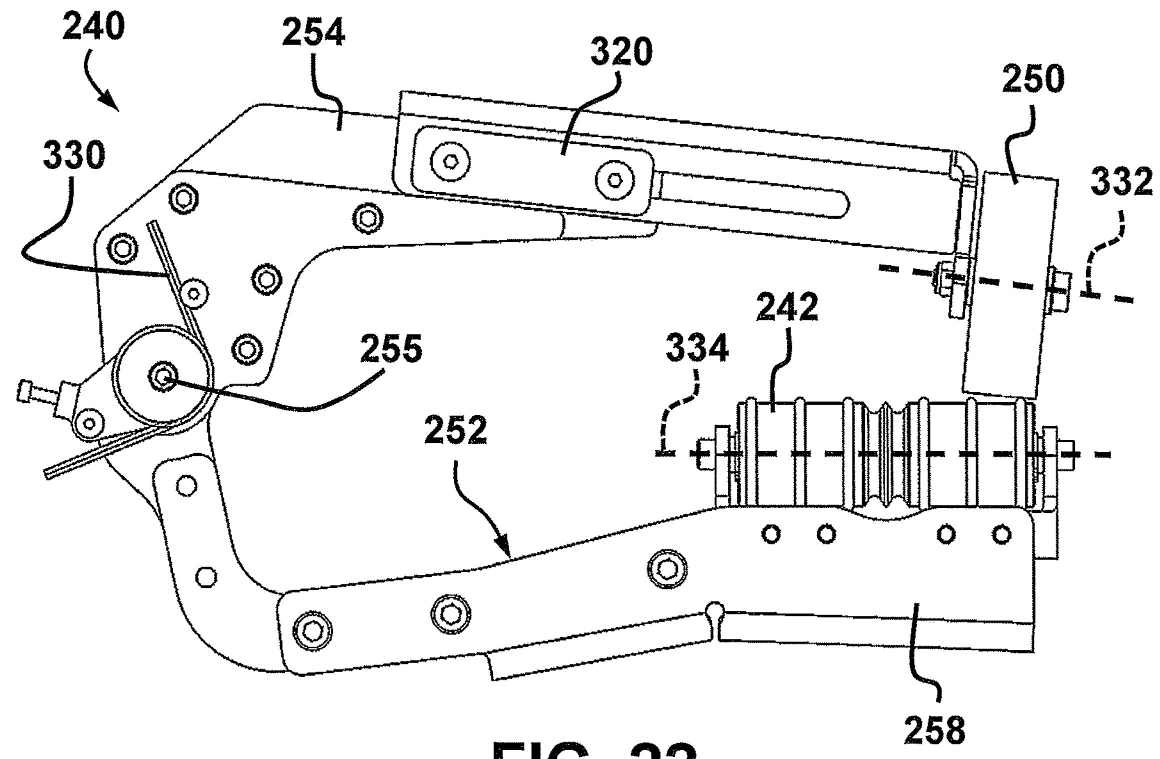
FIG. 22 is an enlarged side view illustrating another example of a roller unit for the repositioning station.

FIG. 22 is an enlarged side view illustrating another example of a roller unit 240 for the repositioning station 200. This model of roller unit 240 includes, among other things, a two-part support arm 254. The length of the support arm 254 can be modified so as to change the position of the overhead roller 250 with reference to the pivot axis 255. The distal part of the support arm 254, at the end of which the overhead roller 250 is located, can slide with reference to the proximal part, and a locking mechanism 320 is provided between them to secure these two parts during operation. This locking mechanism 320 can include a pair of spaced apart set screws that can be untightened to slide the two parts along an intervening slot and that can be tightened to prevent them from moving relative to one another. The rotation axis 332 of the overhead roller 250 can be parallel to the longitudinal direction of the support arm 254, as shown.

Figure 23:
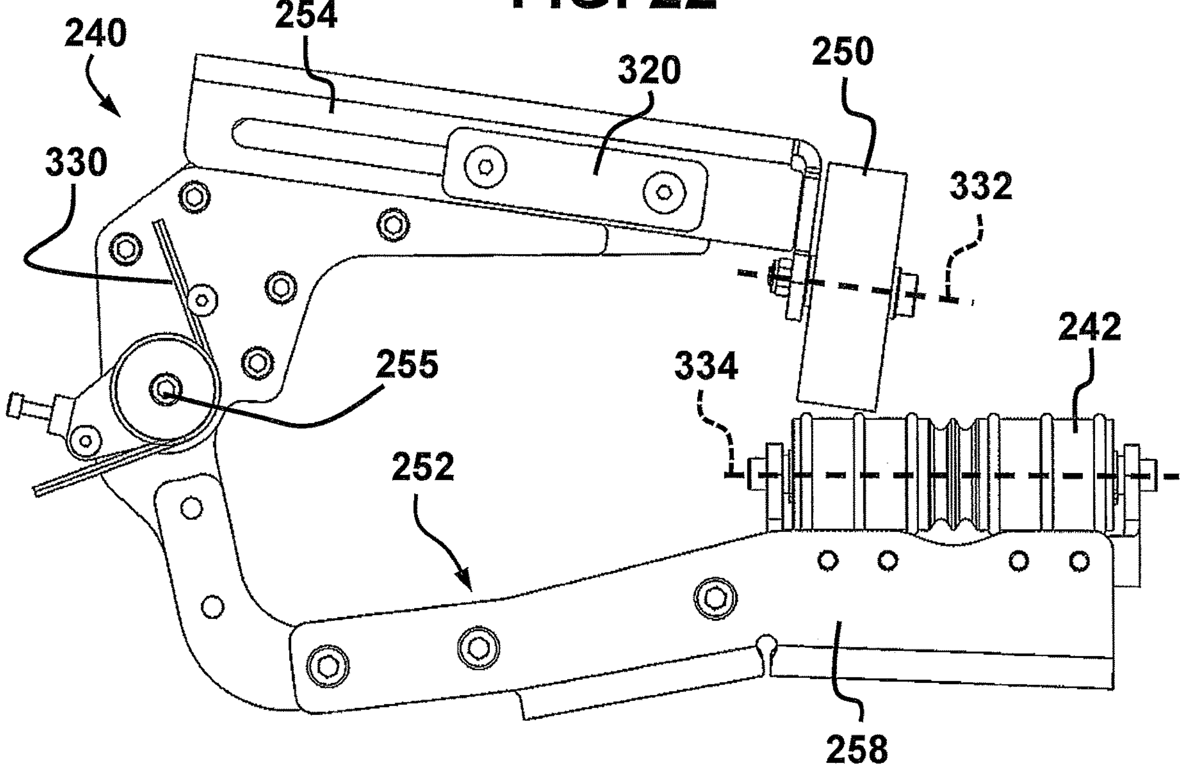
FIG. 23 is a view similar to FIG. 22 but showing the support arm being shorter.

FIG. 23 is a view similar to FIG. 22 but showing the support arm 254 being shorter.

Adjusting the length of the support arm 254 can be useful when cartons 100 of various shapes and sizes are transported through the repositioning station 200. Some cartons 100 may include voids or have protruding features. Changing the position of the overhead roller 250 so as to prevent these features from being damaged, or because having another position will be better, could be desirable. Other configurations and arrangements are possible. Among other things, the exact constructions of the parts and their relative position or orientation can vary from one implementation to another. The locking mechanism 320 can be different from the one shown and described. Other kinds of adjustments can be added to the roller unit 240. Having adjustable support arms 254 can be omitted in some implementations. Many other variants are possible as well.

FIGS. 22 and 23 further show that the roller unit 240 can include a torsion spring 330. This torsion spring 330 replaces the pneumatic actuator 256 shown in FIG. 10. It is provided to apply a force urging the overhead roller 250 towards the underside roller 242. Other configurations and arrangements are possible. Among other things, the exact nature, position, and configuration of a spring system within each roller unit 240 can vary from one implementation to another. A roller unit 240 can include more than one spring, or simply relying on gravity. A spring can be provided without the support arm 254 being adjustable in length. Many other variants are possible as well.

Figure 24:
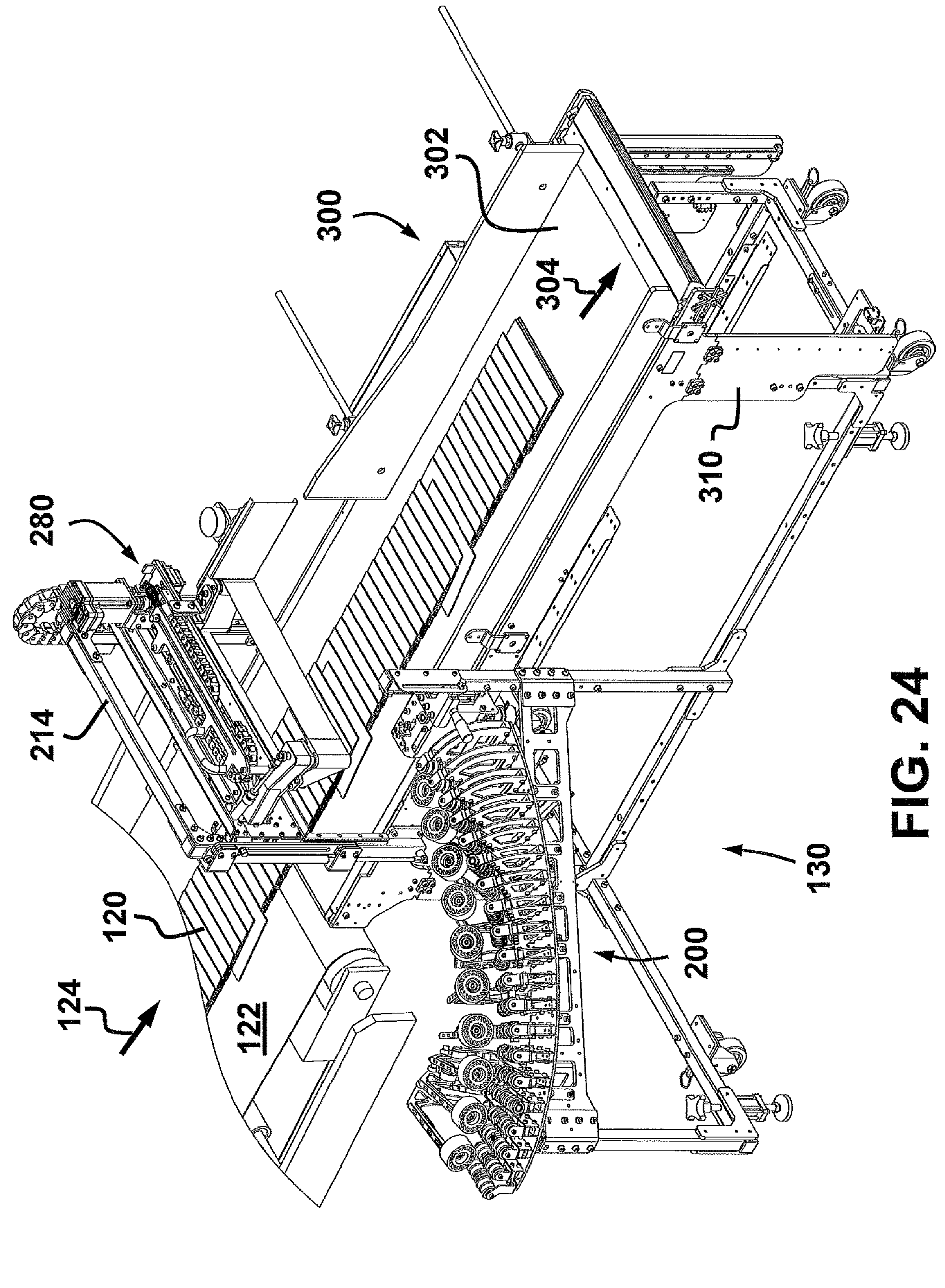
FIG. 24 is an isometric view of the system shown in FIG. 3 but where the repositioning station is temporarily bypassed.

FIG. 24 is an isometric view of the system 130 shown in FIG. 3 but where the repositioning station 200 is temporarily bypassed. In this implementation, the outgoing conveyor 302 can be aligned directly with the end of the incoming conveyor 122, for instance because a particular model of cartons 100 being manufactured does not require any repositioning using the repositioning station 200. As can be seen, the second transfer unit 280 was moved upwards to be out of the way of the shingled stream 120 passing directly from the first conveyor 122 to the outgoing conveyor 302 on its way to the packing station 300 or to any other downstream equipment or location. The second transfer unit 280 can include a supporting frame 214, for instance having two opposite vertical posts and an overhead transversal horizontal beam, along which the second transfer unit 280 can be modified. The outgoing conveyor 302 is often easier to relocate than the incoming conveyor 122 and one can bring the outgoing conveyor 302 into alignment with the incoming conveyor 122 until the repositioning station 200 is needed again. Wheels can be already present under the supporting framework 310 to facilitate handling, and supporting legs can be used thereafter to maintain the parts in position during operation. While the possibility of creating a bypass is not directly the result of the operation of the repositioning station 200, it can still be a key feature for some manufacturers because it allows them to have a repositioning station when needed but still be able to reconfigure the floor space quickly when this is required. Other configurations and arrangements are possible. Among other things, this feature can be entirely omitted in some implementations or be configured differently. Other variants are possible as well.

Figure 25:
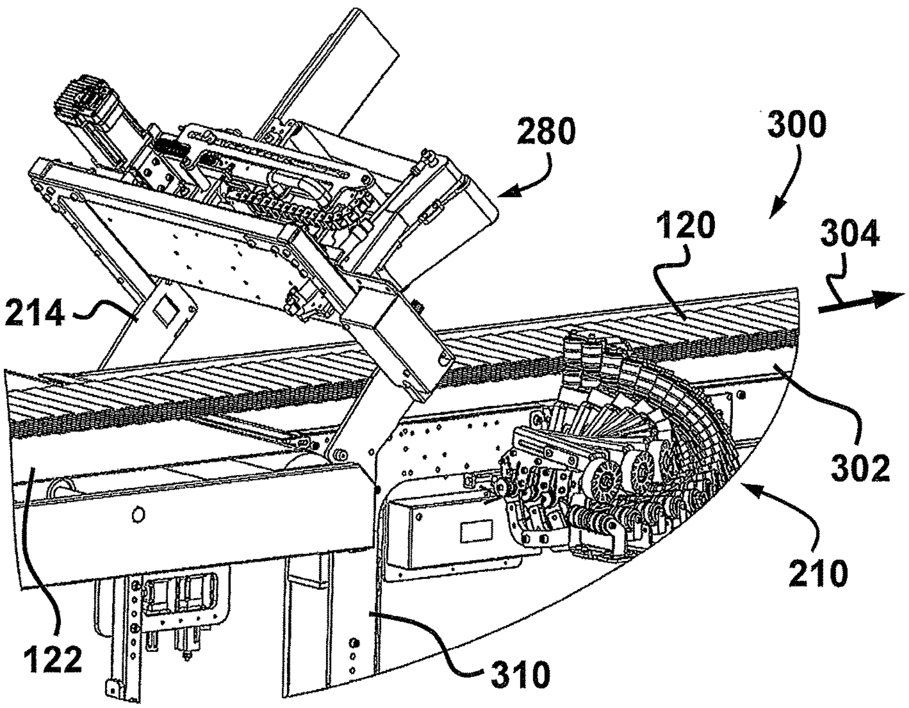
FIG. 25 is an isometric view illustrating another example of a system where the repositioning station includes a second transfer unit mounted on a support frame that can pivot with reference to a transversal bottom axis so as to create a bypass similar to the one shown in FIG. 24.

FIG. 25 is an isometric view illustrating another example of a system 130 where the repositioning station 200 includes a second transfer unit 280 mounted on a support frame 214 that can pivot with reference to a transversal bottom axis so as to create a bypass similar to the one shown in FIG. 24. Opposite bottom ends of the support frame 214 can be pivotally attached to the supporting framework 310, as shown. A lift system (not shown) can be provided, if desired, to facilitate handling or to move the whole section using an actuator or the like. Other configurations and arrangements are possible.

Figure 26:
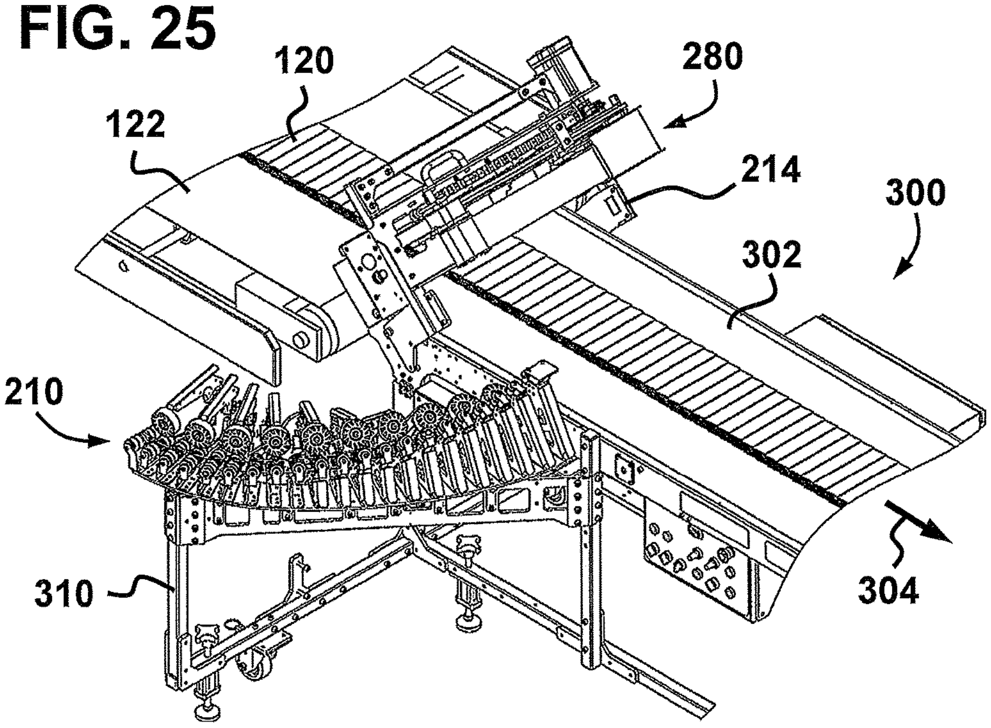
FIG. 26 is an isometric view of what is shown in FIG. 25 but from another viewpoint.

FIG. 26 is an isometric view of what is shown in FIG. 25 but from another viewpoint.

FIGS. 25 and 26 further show that the first transfer unit 260 can include one or more rollers instead of an endless belt system. The first transfer unit 260 includes adjacent rollers in this illustrated example. These rollers can be similar to the rollers 242. Other configurations and arrangements are possible. Among other things, the number of roller in this kind of first transfer unit 260 and their shape can be different. Other variants are possible as well.

Figure 27:
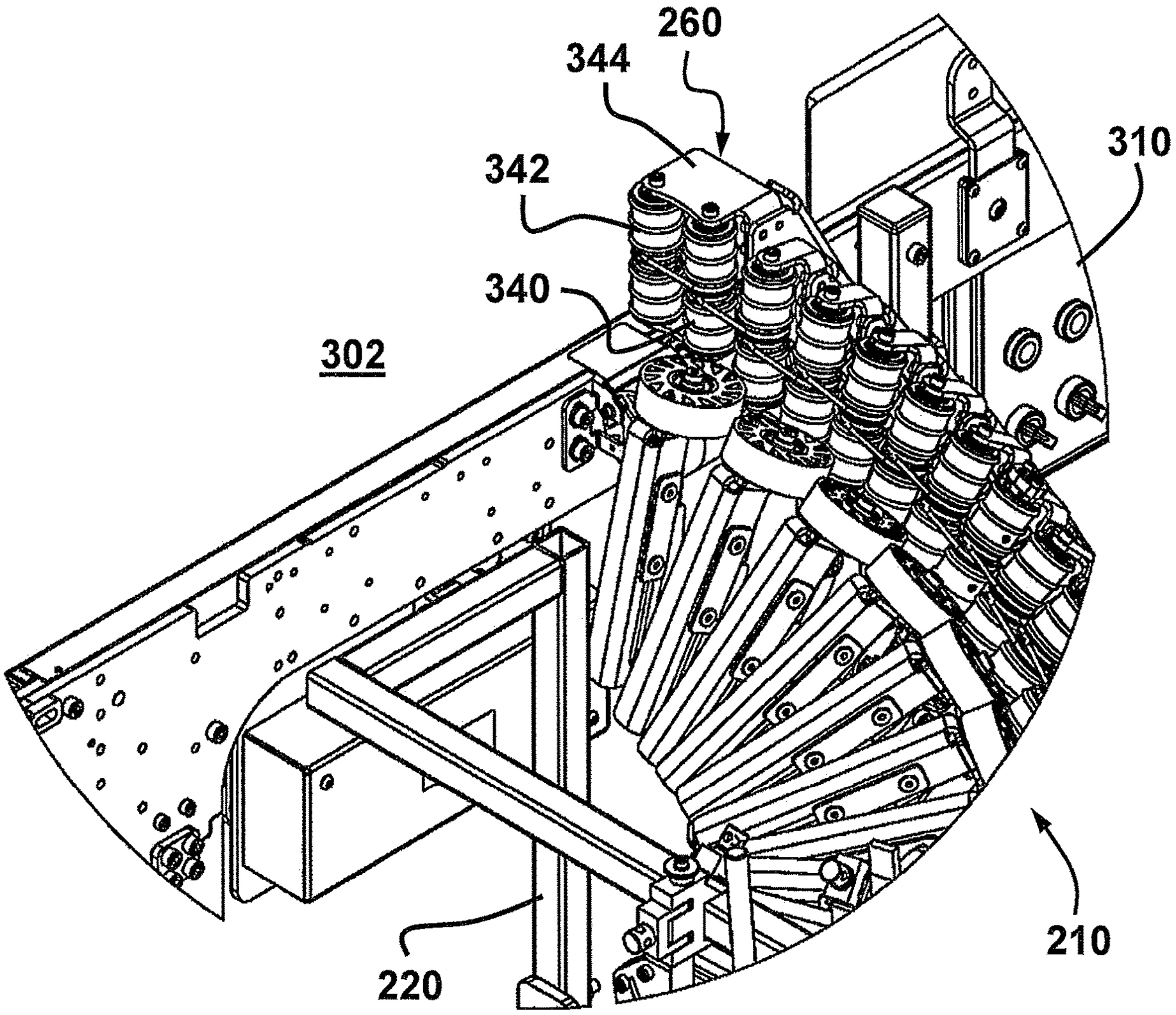
FIG. 27 is an enlarged isometric view of the first transfer unit shown in FIGS. 25 and 26.

FIG. 27 is an enlarged isometric view of the first transfer unit 260 shown in FIGS. 25 and 26. The second transfer unit 280 and various other parts that can be seen in FIGS. 25 and 26 are not shown in FIG. 27 for the sake of illustration. FIG. 27 shows that the first transfer unit 260 can be configured as a continuity of the lateral deviation assembly 210, for instance having its rollers 340, 342 in a torque-transmitting engagement with adjacent rollers 242 of the lateral deviation assembly 210. The two rollers 340, 342 of this first transfer unit 260 can rotate about a vertical axis and van be mounted using a corresponding support casing 344, as shown in the illustrated example. Other configurations and arrangements are possible. Among other things, the rollers of the first transfer unit 260 can be driven using their own motor or using another arrangement. They can also be supported through another kind of arrangement instead of the support casing 344. The rotation axis of the rollers can be oriented differently in some implementations. Other variants are possible as well.

Figure 28:
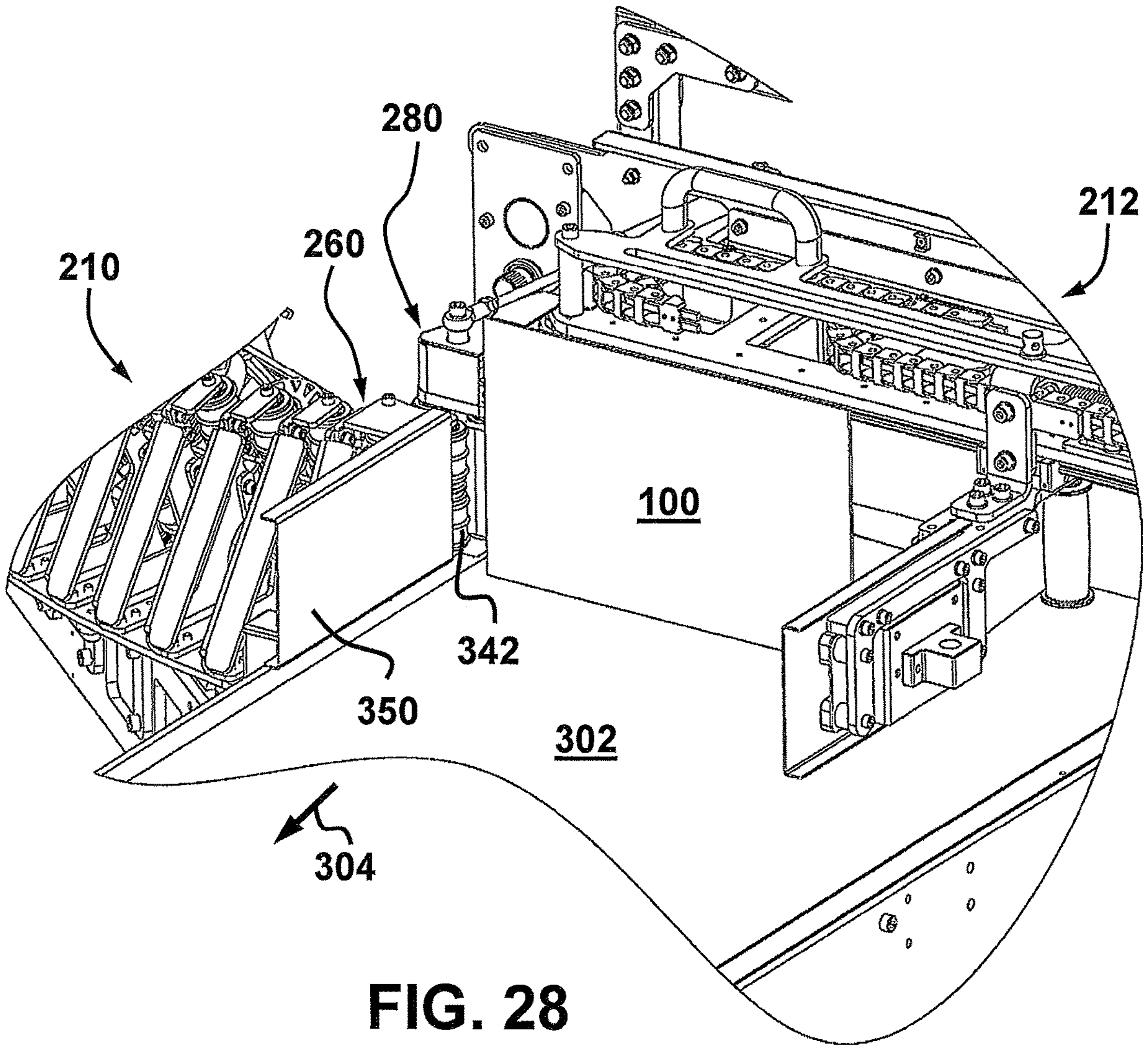
FIG. 28 is an enlarged isometric view illustrating a final positioning assembly where the first transfer unit shown in FIG. 25 is provided.

FIG. 28 is an enlarged isometric view illustrating the final positioning assembly 212 having a first transfer unit 260 as shown in FIG. 27. FIG. 28 also shows a single carton 100 only for the sake of illustration. The final positioning assembly 212 can include a vertical side plate 350 extending parallel to the third direction 304 and located immediately after the last roller 342 of the first transfer unit 260, as shown. Other configurations and arrangements are possible. Among other things, at least some of the features described in the present paragraph or shown in the corresponding figures, or both, can be omitted in some implementations. They can also be designed or disposed differently. Other variants are possible as well.

Figure 29:
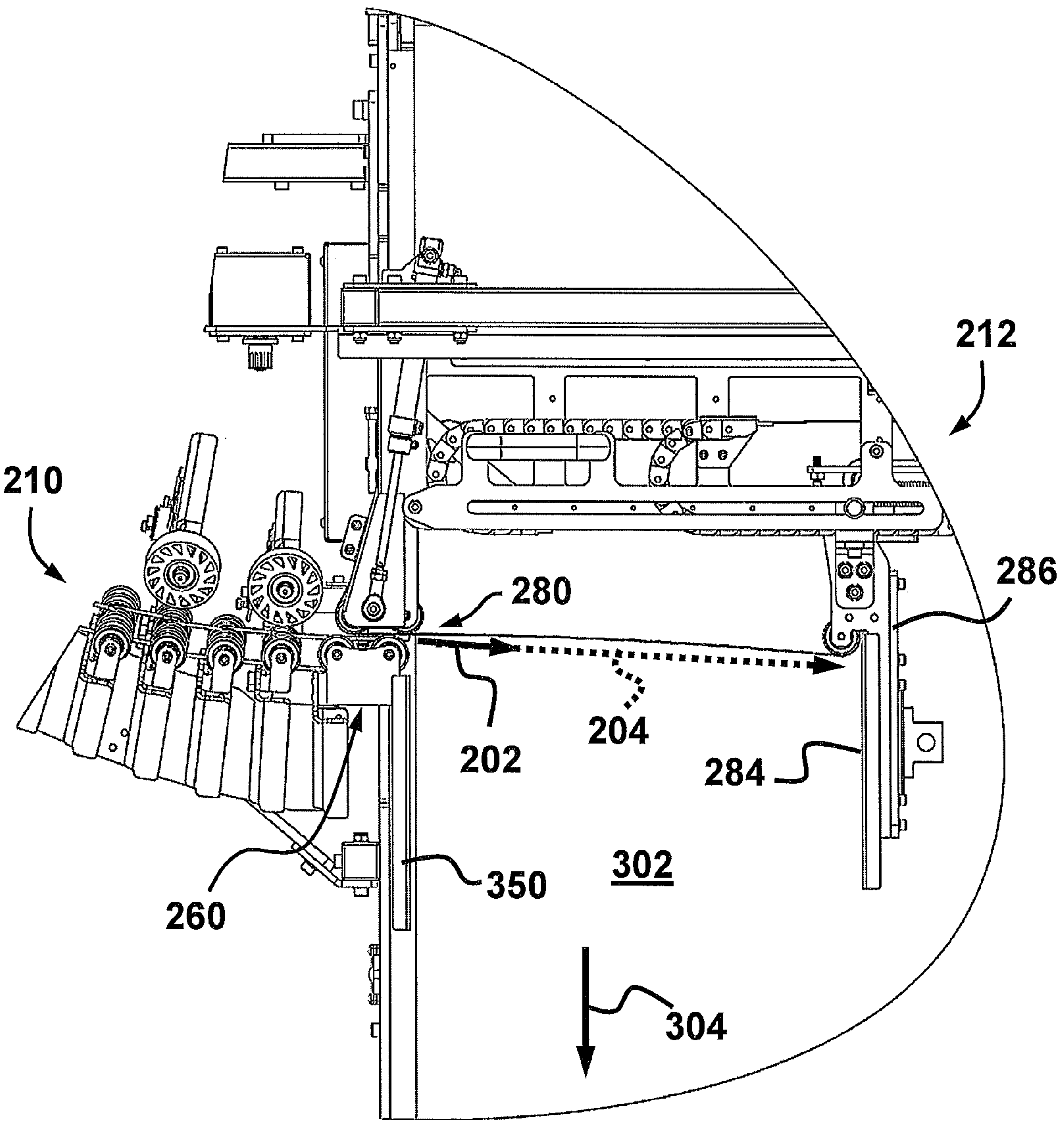
FIG. 29 is a top plan view of what is shown in FIG. 28.

FIG. 29 is a top plan view of what is shown in FIG. 28, with the exception of the carton 100.

Figure 30:
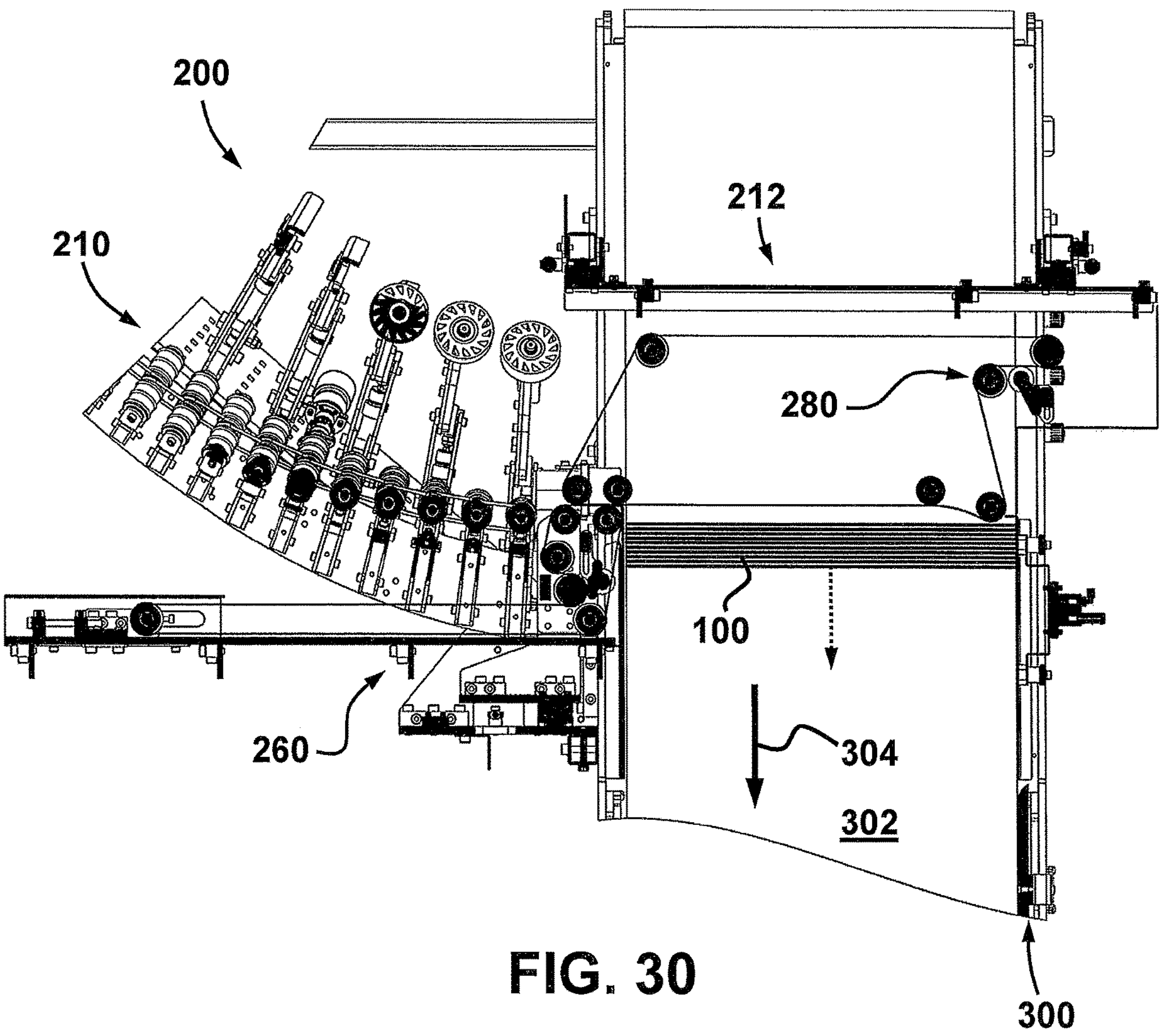
FIG. 30 is a top plan view similar to FIG. 20 but illustrating another example of the repositioning station where the first transfer unit includes a vertical endless belt and can be moved transversally.

FIG. 30 is a top plan view similar to FIG. 20 but illustrating another example of a repositioning station 200 where the first transfer unit 260 includes a vertical endless belt and can be moved transversally to handle narrower cartons 100.

Figure 31:
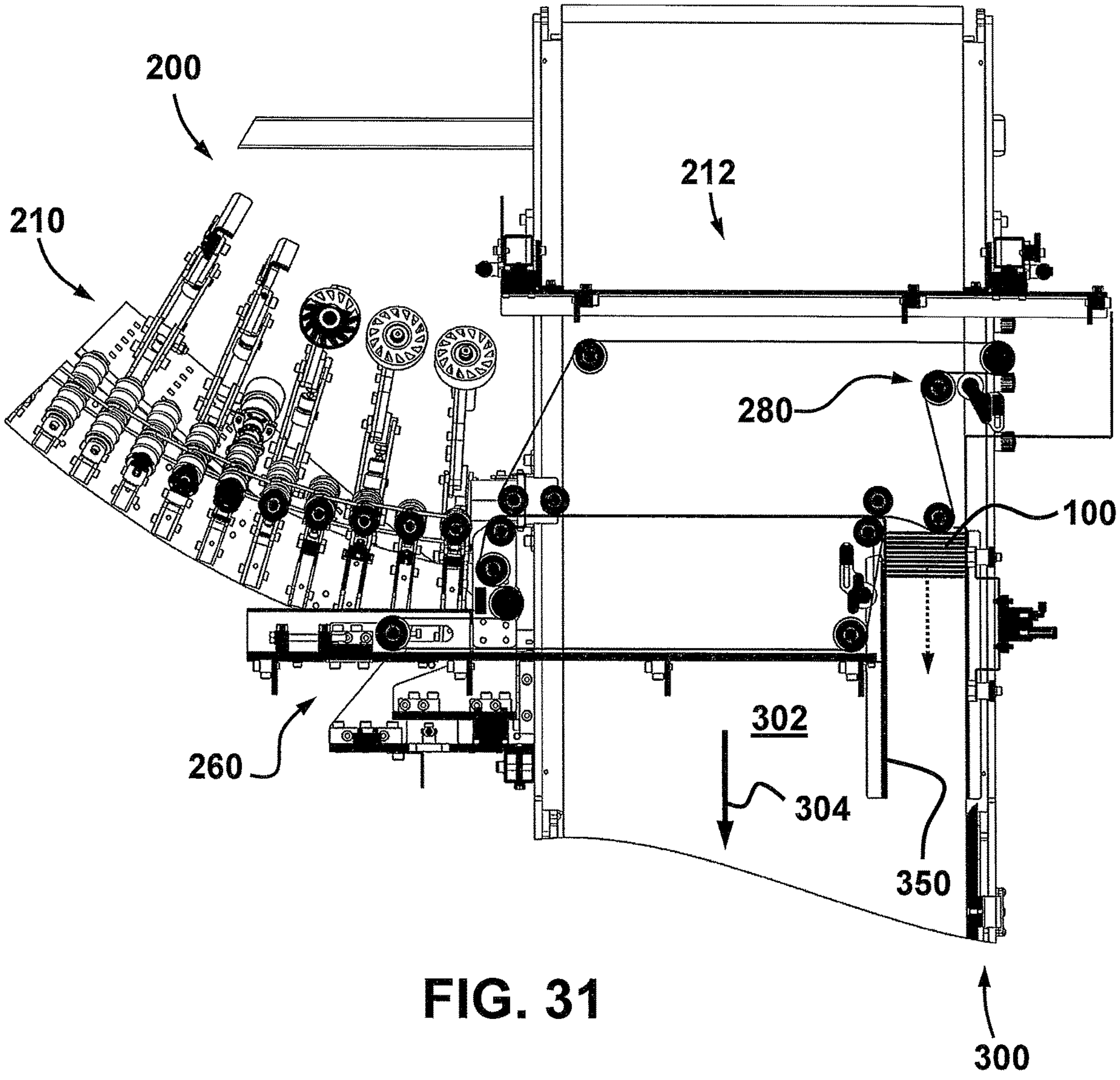
FIG. 31 is a view similar to FIG. 30 but where significantly narrower cartons are used for the sake of illustration.

FIG. 31 is a view similar to FIG. 30 but with significantly narrower cartons 100. The stack of cartons 100 is now adjacent to the left side of the outgoing conveyor 302 with reference to the third direction 304. Unlike the similar narrow stack shown in FIG. 21, the cartons 100 in FIG. 31 are now close to the opposite side of the outgoing conveyor 302. The first transfer unit 260 in FIGS. 30 and 31 includes a plurality of rollers and some of these parts can be mounted on a framework that can be transversally repositioned so as to move the leading end of the first transfer unit 260 closer or away from the opposite side. The vertical side plate 350 is then also repositioned in the example. The narrower cartons 100 in the illustration will be carried transversally between the two transfer units 260, 280 over a longer distance to reach their destination. This arrangement, although more complex compared to others, can be useful in some cases, for instance in an implementation where operators or the machinery at the packing station will be on this side. Other configurations and arrangements are possible. Among other things, at least some of the features described in the present paragraph or shown in the corresponding figure, or both, can be omitted in some implementations. They can also be designed or disposed differently. Other variants are possible as well.

Figure 32:
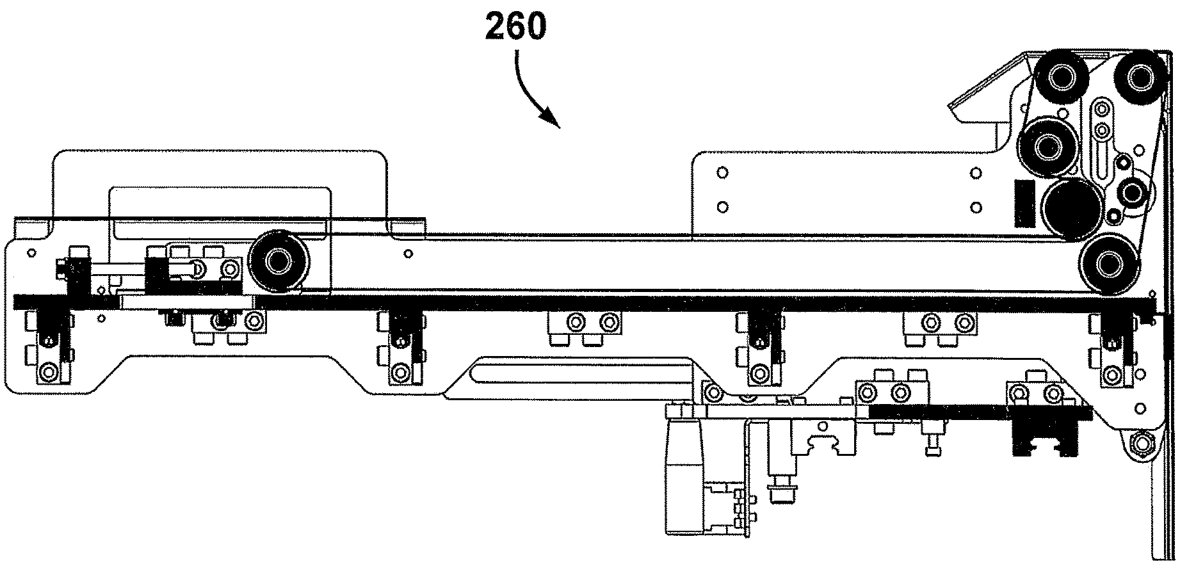
FIG. 32 is a top plan view of the first transfer unit that is configured and set as shown in FIG. 30.

FIG. 32 is a top plan view of the first transfer unit 260 that is configured as shown in FIG. 30.

Figure 33:
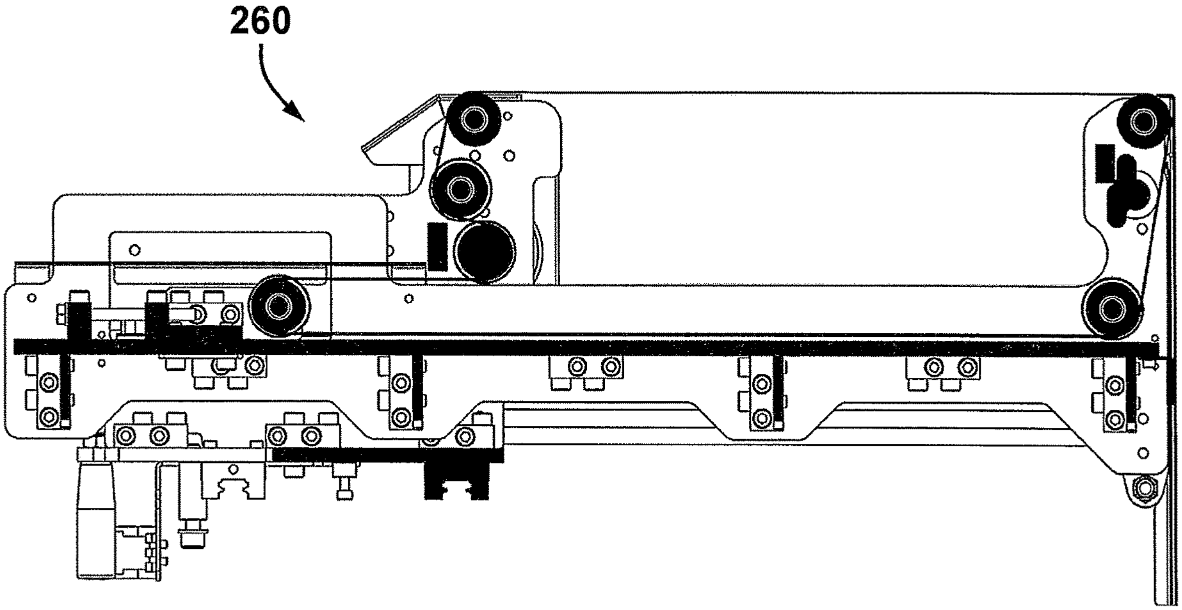
FIG. 33 is a view similar to FIG. 32 but where the first transfer unit is configured and set in an extended position as shown in FIG. 31.

FIG. 33 is a view similar to FIG. 32 but shows the first transfer unit 260 being configured in an extended position as shown in FIG. 31.

Figure 34:
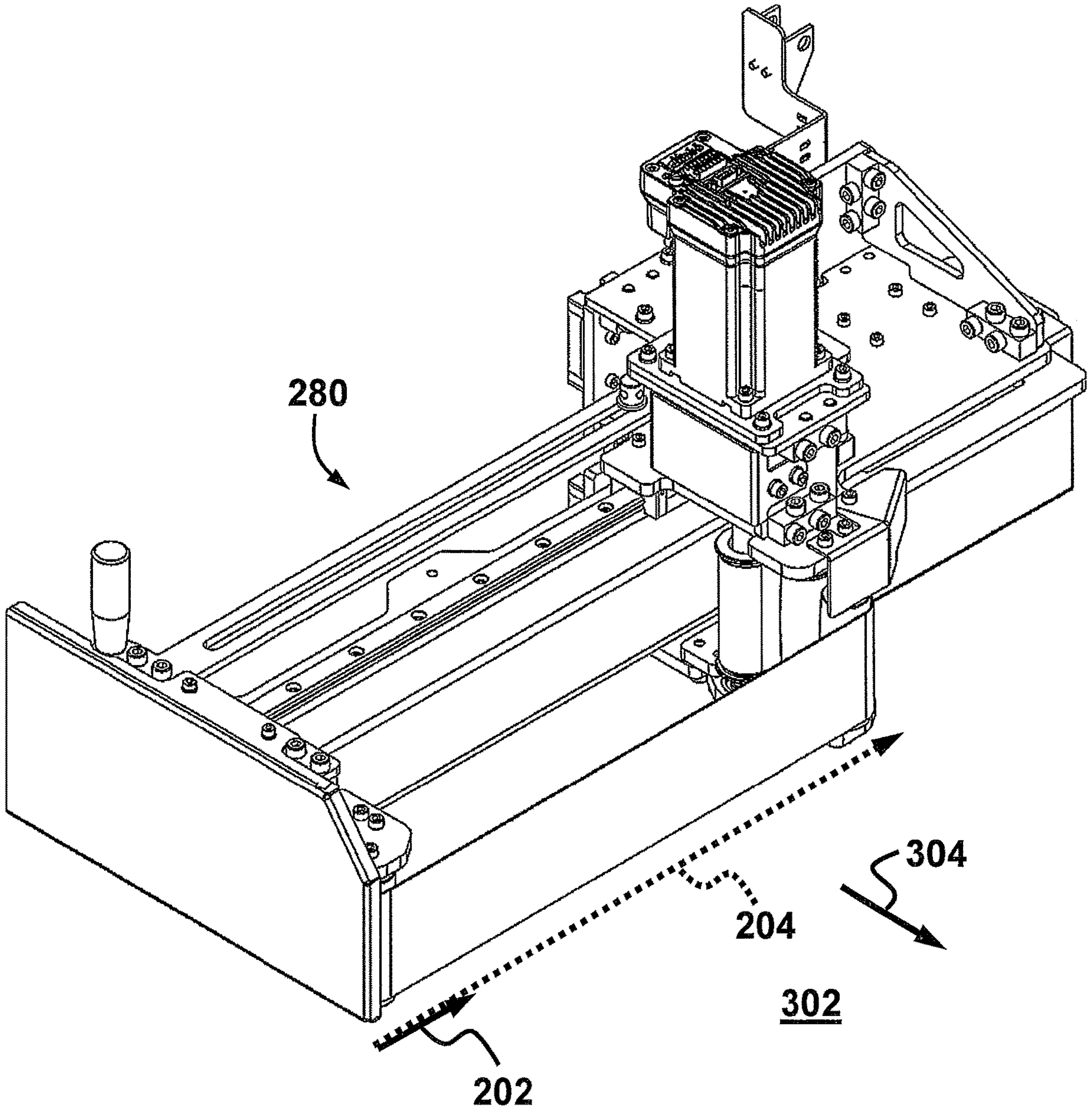
FIG. 34 is an isometric view of the second transfer unit in the repositioning station shown in FIG. 30.

FIG. 34 is an isometric view of the second transfer unit 280 in the repositioning station 200 shown in FIGS. 30 and 31.

Figure 35:
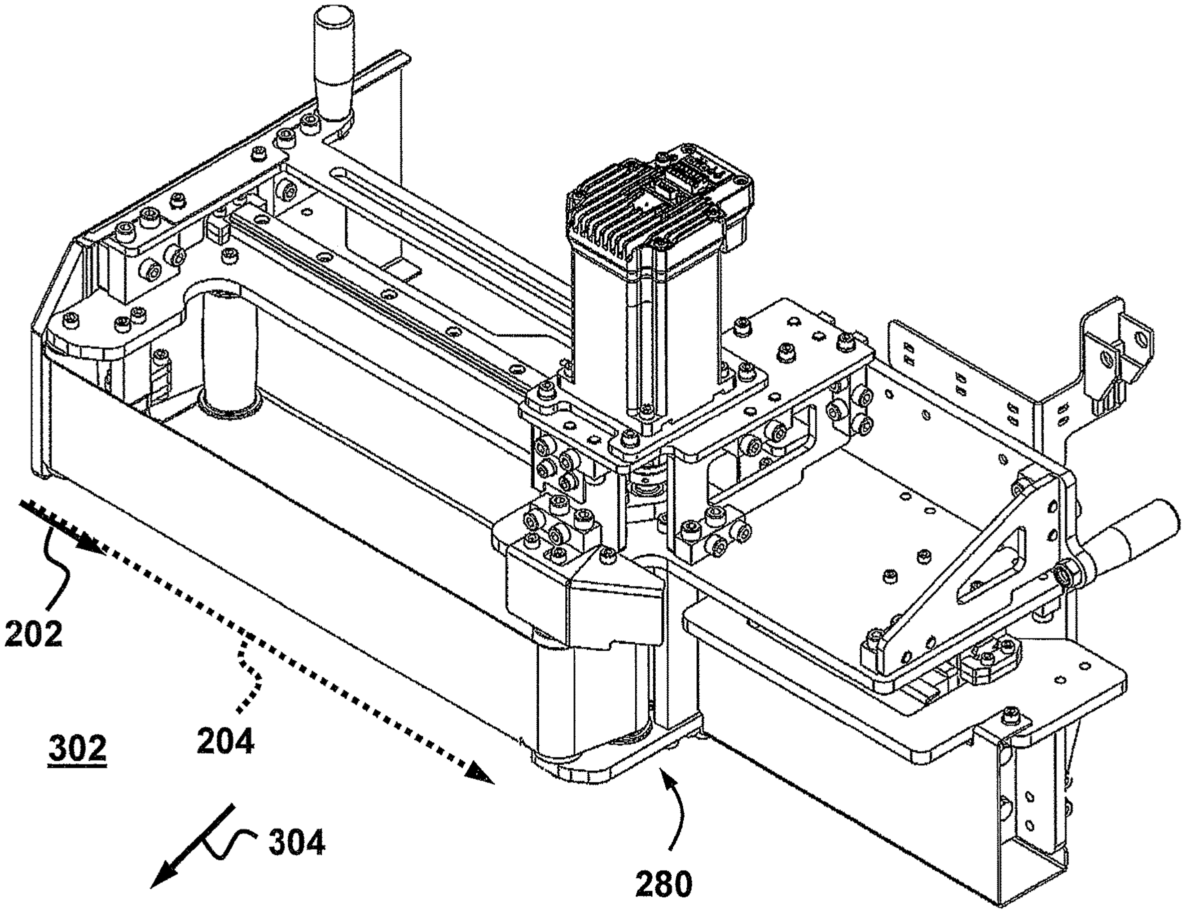
FIG. 35 is a view similar to FIG. 34 but from another viewpoint.

FIG. 35 is a view similar to FIG. 34, but from another viewpoint.

Figure 36:
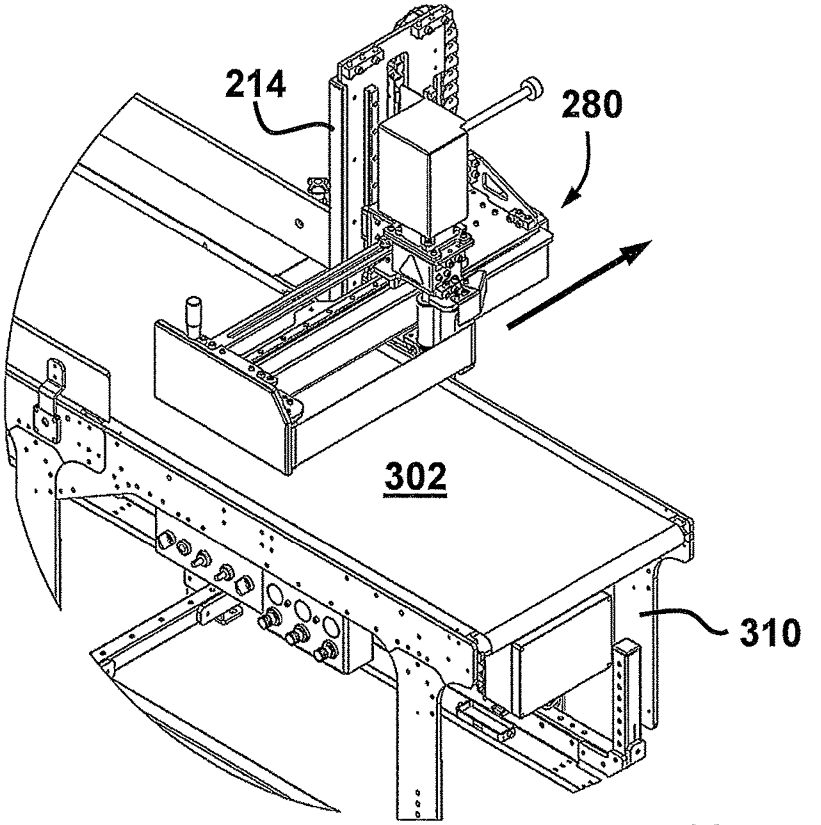
FIGS. 36 and 37 are isometric views illustrating an example of a system having the second transfer unit as shown in FIGS. 34 and 35 that can be moved transversally with reference to the outgoing conveyor so as to create a bypass similar to the one shown in FIG. 24.
Figure 37:
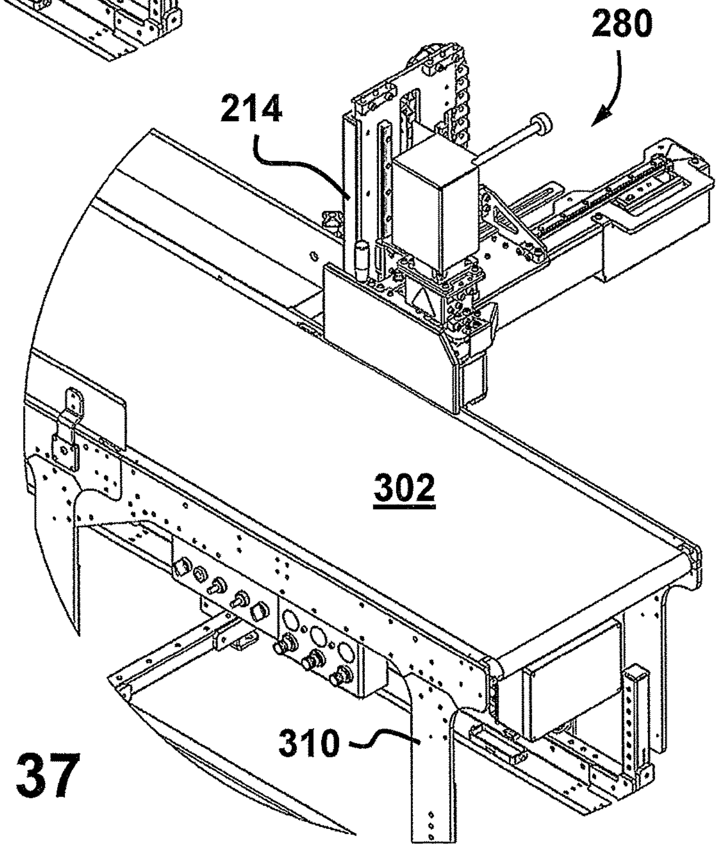

FIGS. 36 and 37 are isometric views illustrating an example of a system 130 having the second transfer unit 280 as shown in FIGS. 34 and 35 that can be moved laterally with reference to the outgoing conveyor 302 so as to create a bypass similar to the one shown in FIG. 24. The support frame 240 is configured and disposed so that parts of the second transfer unit 280 can be moved to the side.

The present detailed description and the appended figures are meant to be exemplary only, and a skilled person will recognize that variants can be made in light of a review of the present disclosure without departing from the proposed concept. Among other things, and unless otherwise explicitly specified, none of the parts, elements, characteristics or features, or any combination thereof, should be interpreted as being necessarily essential to the invention simply because of their presence in one or more examples described, shown and/or suggested herein.

REFERENCE NUMBERS

100 carton
100' laterally offset carton
102 edge (of the carton 100)
104 edge (of the carton 100)
106 edge (of the carton 100)
108 edge (of the carton 100)
120 continuous shingled stream
122 incoming conveyor
124 first direction
130 system
150 folding-gluing machine
200 repositioning station
202 second direction
204 transport circuit
206 curvilinear axis
210 lateral deviation assembly
212 final positioning assembly
214 supporting frame
220 supporting framework (of the lateral deviation assembly)
230 lateral guiding device
240 roller unit
242 underside roller
244 motor
246 groove
248 ring
250 overhead roller
252 biasing arrangement
254 support arm
255 pivot axis (of the support arm)
256 pneumatic actuator
257 side extension (on the support arm)
258 holding member
259 main bracket
260 first transfer unit
261 endless belt
262 slotted bracket

263 corner
264 entry plate
265 motor
270 bottom roller
280 second transfer unit
281 endless belt
282 entry roller assembly
283 motor
284 end plate
286 exit roller and plate assembly
288 vibrating device
300 packing station
302 outgoing conveyor
304 third direction
310 supporting framework (of the outgoing conveyor)
320 locking mechanism
330 torsion spring
332 rotation axis (of the overhead roller)
334 rotation axis (underside roller)
340 roller (for the first transfer unit)
342 roller (for the first transfer unit)
344 support casing

The invention claimed is:

1. A repositioning station (200) for a continuous shingled stream (120) of overlapping semirigid planar articles (100) in which the articles (100), being carried upon an incoming conveyor (122) in a flat configuration and in a facedown position, enter the repositioning station (200) in a first horizontal direction (124) and then transported by the repositioning station (200) in a second horizontal direction (202) onto an outgoing conveyor (302) to form a stack with the articles (100) in an upright position that is carried away upon the outgoing conveyor (302) in a third horizontal direction (304), the repositioning station (200) defining a transport circuit (204) and including:

a lateral deviation assembly (210) located at an inlet of the repositioning station (200), the lateral deviation assembly (210) including a plurality of lengthwise-disposed roller units (240) along which the transport circuit (204) follows a generally ellipsoidal deviation path to veer the shingled stream (120) from the first direction (124) to the second direction (202) and also to pivot the articles (100) in the shingled stream (120) from the facedown position to the upright position about a curvilinear axis (206) coinciding with an innermost and bottommost boundary of the transport circuit (204) throughout the lateral deviation assembly (210).

2. The repositioning station (200) according to claim 1, wherein the second direction (202) is substantially perpendicular to the first direction (124) and the third direction (304) is substantially parallel to the first direction (124).

3. The repositioning station (200) according to claim 1, wherein the repositioning station (200) includes a final positioning assembly (212) located at an outlet of the repositioning station (200) and including at least one transfer unit (260, 280) to carry the articles (100) in the second direction (202) from an outlet of the lateral deviation assembly (210) up to an end of the transport circuit (204), the final positioning assembly (212) extending at least partially across the outgoing conveyor (302).

4. The repositioning station (200) according to claim 1, wherein the repositioning station (200) includes a final positioning assembly (212) located at an outlet of the repositioning station (200) to carry the articles (100) in the second direction (202) from an outlet of the lateral deviation assembly (210) up to an end of the transport circuit (204), the final positioning assembly (212) including:

a first transfer unit (260) positioned at the outlet of the lateral deviation assembly (210); and a second transfer unit (280) extending across the outgoing conveyor (302), the second transfer unit (280) having a portion facing a corresponding portion of the first transfer unit (260).

5. The repositioning station (200) according to claim 4, wherein the second transfer unit (280) is configured and disposed to be moved away from the outgoing conveyor (302) when the shingled stream (120) must temporarily bypass the repositioning station (200).

6. The repositioning station (200) according to claim 4, wherein the first transfer unit (260) is configured and disposed to be adjusted in height.

7. The repositioning station (200) according to claim 4, wherein the second transfer unit (280) includes a vertically disposed endless belt (281) driven by a corresponding motor (283).

8. The repositioning station (200) according to claim 4, wherein the first transfer unit (260) includes a vertically disposed endless belt (261) driven by a corresponding motor (265).

9. The repositioning station (200) according to claim 4, wherein the first transfer unit (260) includes at least one roller.

10. The repositioning station (200) according to claim 1, wherein the roller units (240) include:

a plurality of motorized underside rollers (242) extending perpendicularly with reference to the transport circuit (204) to engage a first side of the shingled stream (120);

a plurality of overhead rollers (250) positioned above the underside rollers (242) to engage a second side of the shingled stream (120); and a plurality of biasing arrangements (252), each urging a corresponding one of the overhead rollers (250) towards the underside rollers (242).

11. The repositioning station (200) according to claim 10, wherein at least some of the motorized underside rollers (242) are in torque-transmitting engagement with one another.

12. The repositioning station (200) according to claim 1, wherein the curvilinear axis (206) is substantially horizontal and uniplanar within the lateral deviation assembly (210).

13. The repositioning station (200) according to claim 1, further including a lateral guiding device (230) immediately upstream the lateral deviation assembly (210).

14. The repositioning station (200) according to claim 1, in which the articles are carried upon an incoming conveyor and then transported by the repositioning station in a second horizontal direction onto an outgoing conveyor, wherein the incoming conveyor (122) and the outgoing conveyor (302) are endless-belt conveyors.

* * * * *